(12) United States Patent
Takeuchi et al.

(10) Patent No.: US 7,126,309 B1
(45) Date of Patent: Oct. 24, 2006

(54) MOTOR

(75) Inventors: Kesatoshi Takeuchi, Shioziri (JP); Takahiro Sagawa, Chino (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 10/562,580

(22) PCT Filed: May 17, 2005

(86) PCT No.: PCT/JP2005/009316

§ 371 (c)(1),
(2), (4) Date: Dec. 28, 2005

(87) PCT Pub. No.: WO2005/112231

PCT Pub. Date: Nov. 24, 2005

(30) Foreign Application Priority Data

May 18, 2004 (WO) .................. PCT/JP04/07072

(51) Int. Cl.
*H02P 25/00* (2006.01)
(52) U.S. Cl. .................. 318/811; 318/34; 318/599; 310/156.01; 310/156.33; 310/156.36; 310/269
(58) Field of Classification Search .......... 318/811, 318/599, 34, 376; 310/156.01, 156.33, 156.38, 310/269
See application file for complete search history.

(56) References Cited

U.S. PATENT DOCUMENTS

| 3,762,042 | A | * | 10/1973 | Abe et al. .................. 29/598 |
|---|---|---|---|---|
| 4,656,381 | A | * | 4/1987 | Komatsu .................. 310/257 |
| 6,157,112 | A | * | 12/2000 | Suzuki et al. .............. 310/269 |
| 6,297,575 | B1 | | 10/2001 | Yang |
| 6,455,969 | B1 | * | 9/2002 | Chen .......................... 310/114 |
| 6,603,231 | B1 | * | 8/2003 | Dombrovski et al. .. 310/156.01 |
| 2002/0175582 | A1 | | 11/2002 | Lopatinsky et al. |
| 2003/0227287 | A1 | * | 12/2003 | Hori et al. ............. 324/207.25 |

FOREIGN PATENT DOCUMENTS

| JP | 55-117184 | | 8/1980 |
|---|---|---|---|
| JP | 08-051745 | | 2/1996 |
| JP | 9-238479 | A | 9/1997 |
| JP | 9-275672 | A | 10/1997 |
| JP | 3062085 | U | 6/1999 |
| JP | 2000-92759 | A | 3/2000 |
| JP | 2003-506005 | A | 2/2003 |

* cited by examiner

*Primary Examiner*—Rina Duda
(74) *Attorney, Agent, or Firm*—Harness, Dickey & Pierce, P.L.C.

(57) ABSTRACT

The electric machine of the present invention comprises a first coil group containing a plurality of coils and a magnet group. The first coil group is classified into M phase sub coil groups, with the coils of the sub coil groups aligned one at a time in sequence at a specified sub coil group interval Dc from the first phase sub coil group to the M-th phase sub coil group. A sub coil group interval Dc is set to a value of K/M times a magnetic pole pitch Pm (K is a positive integer excluding an integral multiple of M) where the distance corresponding to an electrical angle of π is defined as the magnetic pole pitch Pm. The adjacent sub coil groups are driven at a (K/M)π phase difference. Each coil have substantially no magnetic material core.

13 Claims, 31 Drawing Sheets

Configuration (comparative example)

Alternating current drive signals

Comparative example
Immediately before phase = $2\pi$ (A-phase has polarity reversed at $2\pi$)

Phase = $\pi/4$

Immediately before phase = $\pi/2$ (B-phase has polarity reversed at $\pi/2$)

Phase = $3\pi/4$

First embodiment (two-phase motor)

Alternating current drive signals

First embodiment (two-phase motor)
Immediately before phase = $2\pi$ (A-phase has polarity reversed at $2\pi$)

Phase = $\pi/4$

Immediately before phase = $\pi/2$ (B-phase has polarity reversed at $\pi/2$)

Immediately before phase = $3\pi/4$

Flat arrangement (example 1)

Flat arrangement (example 2)

For large torque generation

For small torque generation

Two-phase motor first variation example
Immediately before phase = $2\pi$ (A-phase has polarity reversed at $2\pi$)

Phase = $\pi/4$

Immediately before phase = $\pi/2$ (B-phase has polarity reversed at $\pi/2$)

Immediately before phase = $3\pi/4$

Two-phase motor second variation example
Immediately before phase = $2\pi$ (A-phase has polarity reversed at $2\pi$)

Two-phase motor third variation example

Two-phase motor fourth variation example

Two-phase motor fifth variation example (one sided arrangement)

Two-phase motor sixth variation example (one sided arrangement)

Insert rotor structure (both sided arrangement)

A-A' cross section

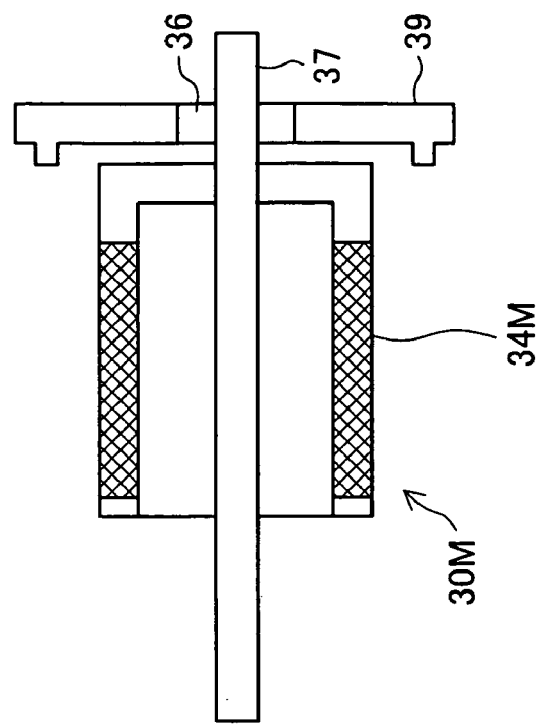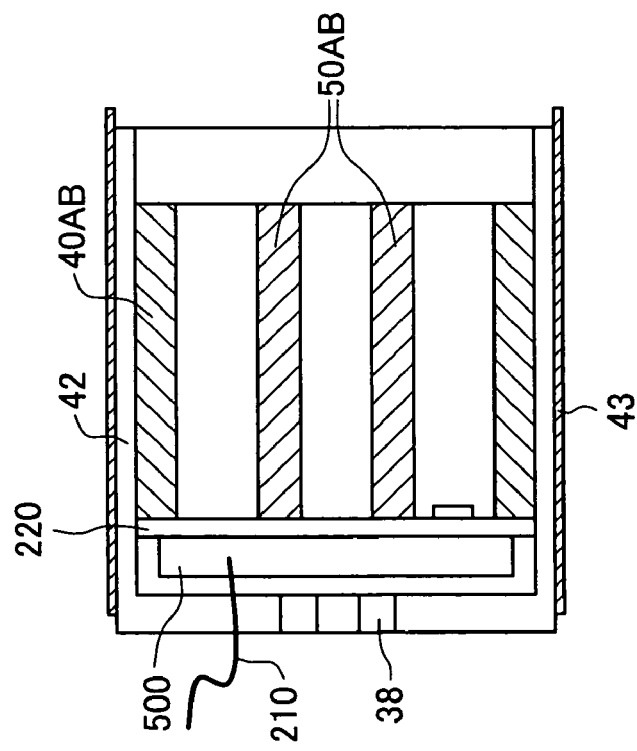
Fig.22(A) Stator
Fig.22(B) Rotor

Inner rotor structure (one sided arrangement)

A-A' cross section

Flat rotor structure (both sides arrangement)

A-A' cross section

Flat rotor structure (one sided arrangement)

A-A' cross section

Second embodiment (three-phase motor)
Immediately before phase = $2\pi$ (A-phase has polarity reversed at $2\pi$)

Immediately before phase = $\pi/3$ (C-phase has polarity reversed at $\pi/3$)

Immediately before phase = $2\pi/3$ (B-phase has polarity reversed at $2\pi/3$)

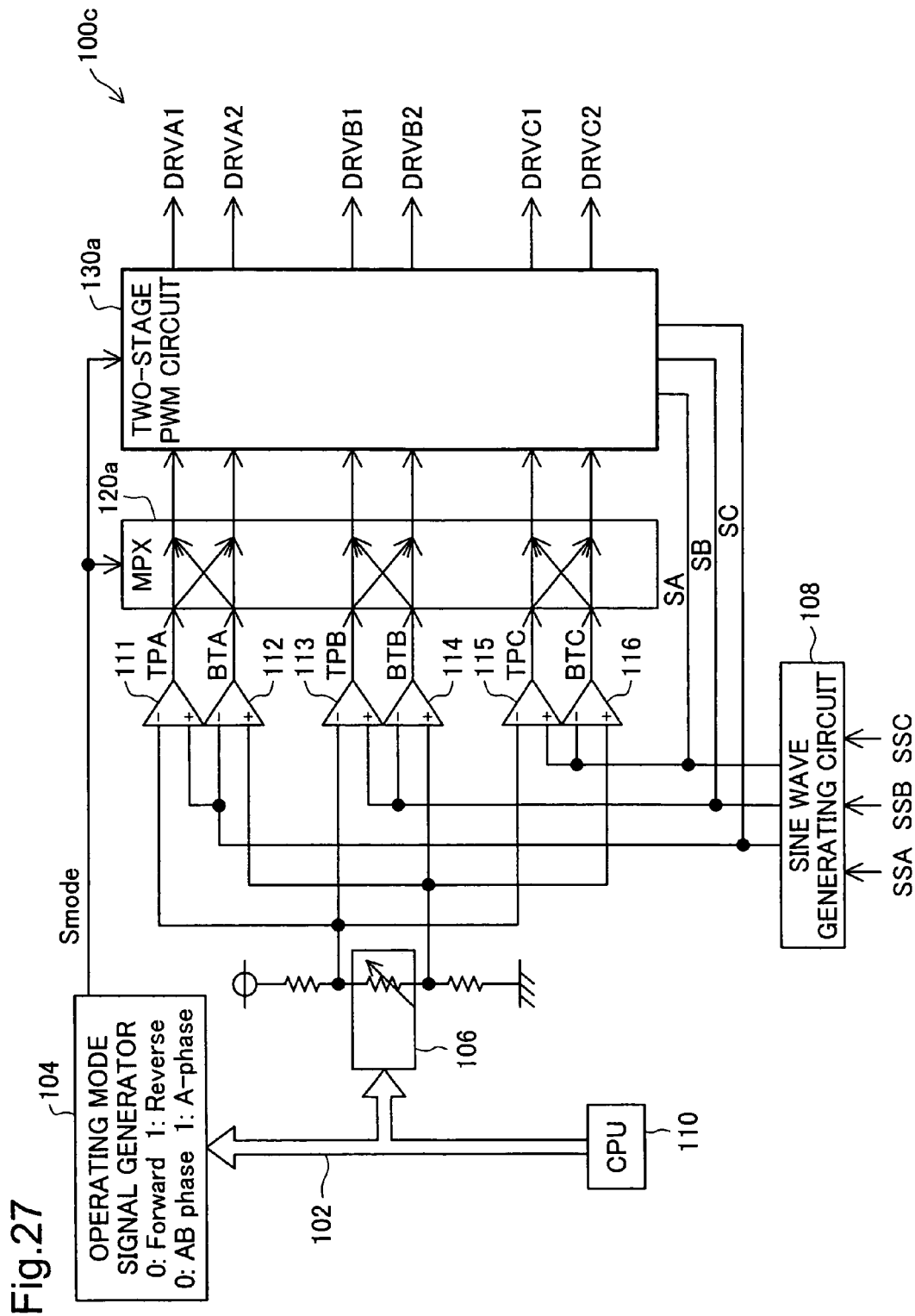

Three-phase timing chart

Period P1

Period P2

Period P3

Period P4

Period P5

Period P6

Third embodiment (four-phase motor)
Immediately before phase = $2\pi$ (D-phase has polarity reversed at $2\pi$)

Immediately before phase = $\pi/4$ (C-phase has polarity reversed at $\pi/4$)

Immediately phase = $\pi/2$ (B-phase has polarity reversed at $\pi/2$)

Immediately before phase = $3\pi/4$ (A-phase has polarity reversed at $3\pi/4$)

Four-phase timing chart

Flat ring shaped coil

Bent ring shaped coil

MOTOR

TECHNICAL FIELD

The present invention relates to an electric machine such as an electric motor, electric power generator, or the like.

BACKGROUND ART

There are two types of electric motors, synchronous motors and induction motors. Also, for the motor types, according to the difference in rotors, it is possible to classify them into a magnet type that uses a permanent magnet, a coil type for which a coil is wound, and a reactance type using a ferromagnetic body such as iron. The magnet type rotates by the permanent magnet of the rotor being drawn to the rotating magnetic field of the stator.

As a magnetic type synchronous motor, there is the compact synchronous motor noted in JP8-51745A, for example. This compact synchronous motor comprises a stator core for which a magnetization coil is wound, and a rotor including a magnet.

However, the conventional motors have increased weight compared to the generated torque, and when an attempt is made to increase the generated torque, there is the problem that the ratio of the generated torque and the weight significantly worsened. Furthermore, when using a higher magnetic flux density magnet, there is also the problem that due to the effect of core loss, this would not operate without the flow of a huge current at startup time.

DISCLOSURE OF THE INVENTION

An object of the present invention is to provide an electric machine with a structure different from that of the prior art.

The electric machine of the present invention comprises a first coil group containing a plurality of coils arranged along a specified direction; and a magnet group facing the first coil group and capable of moving relative to the first coil group along the specified direction. The first coil group is classified into M phase sub coil groups each constituted by n coils where M is an integer of 2 or more and n is an integer of 1 or more, and the coils of the sub coil groups are aligned in sequence one at a time with a specified sub coil group interval Dc from the first phase sub coil group to the M-th phase sub coil group along the specified direction. The sub coil group interval Dc is set to a value of K/M times a magnetic pole pitch Pm (K is a positive integer excluding an integral multiple of M) where the magnetic pole pitch Pm is defined, in relation to the magnet group, to be a distance corresponding to an electrical angle of $\pi$ along the specified direction. The adjacent sub coil groups are driven at a phase difference of $(K/M)\pi$. It is preferable that each coil has substantially no magnetic material core.

Since this electric machine has substantially no magnetic material core, stable, smooth rotation is possible without cogging. Also, there is a relationship of Dc=(K/M)Pm between the sub coil group interval Dc and the magnetic pole pitch Pm, and adjacent sub coil groups are driven at a phase difference of $(K/M)\pi$, so the positional relationship of the coil group and the magnet group does not take the neutral position (a position for which the net force in the operating direction does not work and startup is not possible). Therefore, it is possible to always start up the electric machine in the desired operating direction (forward or reverse).

It is preferable that the integer K and the integer M do not have a common multiple other than 1. The reason for this is that if there is a case of K and M having a common multiple N other than 1, it is conceivable that the substantial phase count of the electric machine is M/N. This is because, for example, in the case of K=6 and M=4, this is constituted as a four-phase electric machine having four sets of sub coils, but it is substantially the same as a two-phase electric machine for which K=3 and M=2.

It is preferable that when the magnet group is seen from the first coil group side, N poles and S poles are arranged alternately along the specified direction. In this case, the pitch between the N pole and the S pole is equal to the magnetic pole pitch Pm.

Alternatively, when the magnet group is seen from the first coil group side, only a specified same one of the N pole and the S pole may be repeatedly arranged along the specified direction. In this case, the pitch between the same poles is equal to 2 times the magnetic pole pitch Pm.

The aforementioned electric machine may also further comprise a case for accommodating the first coil group and the magnet group, wherein each coil is wound around a core formed from a substantially nonmagnetic and non-electroconductive material, and the case is formed from a substantially nonmagnetic and non-electroconductive material.

With this constitution, it is possible to realize an electric machine with almost no core loss.

With the electric machine, structural members with exception of shafts and bearings may be formed from substantially nonmagnetic and non-electroconductive material.

With this constitution, further weight saving is possible, and it is possible to further reduce the core loss.

The integer K may be an odd number, and a coil count n of each sub coil group is 2 or greater, and the coils in the same sub coil group may be interconnected in such a manner that adjacent coils belonging to the same sub coil group are always excited with mutually opposite polarities.

Alternatively, the integer K may be an even number, and a coil count n of each sub coil group is 2 or greater, and the coils in the same sub coil group may be interconnected in such a manner that adjacent coils belonging to the same sub coil group are always excited with a mutually identical polarity.

The electric machine may also comprise a second coil group provided on a opposite side from the first coil group across the magnet group, where a relative position of the second coil group to the first coil group is fixed. It is preferable that the second coil group has same coil arrangement as the first coil group, and that the m-th phase sub coil group (m is an integer from 1 to M) of the first coil group and the m-th phase sub coil group of the second coil group are arranged at opposing positions across the magnet group, and are always magnetized to a mutually identical polarity.

With this constitution, it is possible to effectively use the magnetic flux of both sides of the magnet group, thereby generating a large torque. Also, since the same m-th sub coil groups of the first and second coil groups are opposing each other and magnetized to have the same polarity, the force generated between the first coil group and the magnet group in the direction perpendicular to the operation direction are cancelled with the similar force generated between the second coil group and the magnet group. As a result, the net force along the direction perpendicular to the operation direction is substantially zero, so it is possible to prevent vibration and noise due to this kind of force.

The aforementioned electric machine may also further comprise a drive signal generating circuit for supplying M alternating current drive signals to the M phase sub coil groups, wherein the drive signal generation circuit generates the M alternating current drive signals so that polarity of each coil in each sub coil group are switched when center of each coil is opposite to one of centers of the magnets in the magnet group, and that magnetic flux density in each sub coil group reaches a maximum value at a timing when midway points between two adjacent coils in the same phase sub coil group are opposite to the centers of the magnets in the magnet group.

With this constitution, it is possible to drive the electric machine in synchronism with the drive signals.

It is preferable that the drive signal generating circuit be capable of reversing an operating direction of the first coil group and the magnet group by reversing a current direction of each sub coil group.

The drive signal generating circuit may include a PWM circuit for generating M PWM signals whose phases are mutually shifted by $(K/M)\pi$, and a masking circuit for generating the M alternating current drive signals by masking the M PWM signals according to an output demand of the electric machine.

With this constitution, it is possible to adjust the output of the electric machine by masking the PWM signals with the masking circuit.

The masking circuit may mask each PWM signal in a temporal range that is symmetrically centered around a timing at which polarity of each alternating current drive signal is inverted.

Generally, the tendency is that near the timing at which the polarity of each alternating current drive signal is inverted, the coil does not generate a very effective drive force, and an effective drive force is generated near the peak of the alternating current drive signal. Therefore, with the constitution noted above, the PWM signals are masked during the time when the coil does not generate a very effective drive force, thereby increasing the electric machine efficiency.

It is preferable that the aforementioned electric machine further comprise a regenerative circuit for regenerating electric power from the coil groups, wherein the drive signal generation circuit and the regenerative circuit are capable of operating the electric machine in an operation mode in which a drive force is generated from at least one of the M sub coil groups while electric power is regenerated from at least one other sub coil group.

With this constitution, when necessary, it is possible to operate the electrical machine while simultaneously executing the generation of drive force and the regeneration of electrical power.

The present invention may be realized in various aspects, for example, it is possible to realize the present invention as an electric machine, an electric motor such as a linear motor and a rotation motor, a power generator, and a driving method and drive apparatus for these actuators, motors, and power generators.

BRIEF DESCRIPTION OF THE DRAWINGS

FIGS. 22 (A) and 22 (B) are cross section diagrams showing the constitution of the stator and the rotor.

FIG. 27 is a block diagram showing the constitution of the drive control unit of the second embodiment.

PREFERRED EMBODIMENTS OF THE INVENTION

Embodiments of the invention are described in the following sequence.

A. Comparative Example

B. First Embodiment (Two-Phase Motor)

C. Two-phase Motor Structure Variation Examples

D. Two-phase Motor Circuit Configuration Variation Examples

E. Two-phase Motor Application Examples

F. Second Embodiment (Three-Phase Motor)

G. Third Embodiment (Four-Phase Motor)

H. Other Variation Examples

A. Comparative Example

A comparative example is described before describing embodiments of the present invention.

Figure 1A:
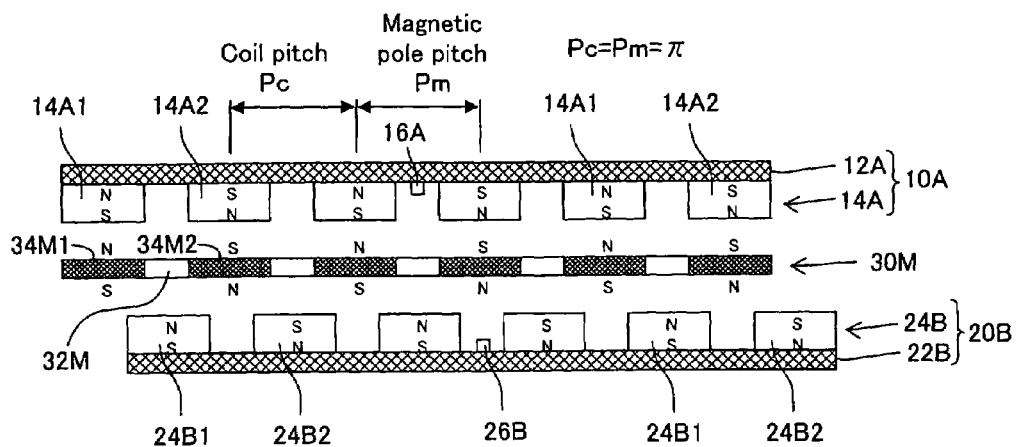
FIGS. 1 (A) and 1 (B) are explanatory drawings showing the electric motor schematic structure and the alternating current drive signal of a comparative example of the present invention.
Figure 1B:
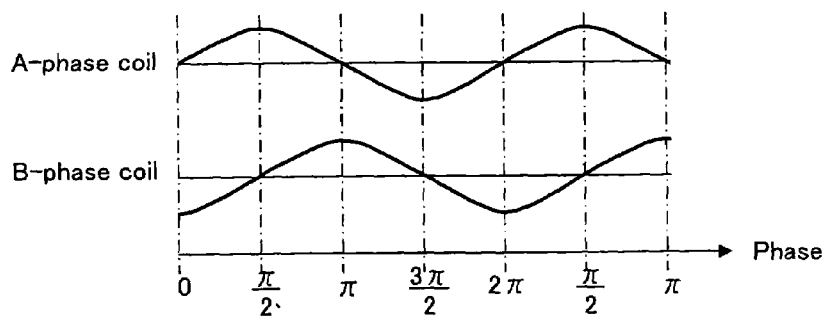

FIG. 1 (A) is an explanatory drawing showing the schematic structure of the electric motor of the comparative example of the present invention. This electric motor comprises a first coil group structure 10A, a second coil group structure 20B, and a magnet group structure 30M.

The first coil group structure 10A comprises a support member 12A and an A-phase coil group 14A fixed to the support member 12A. This A-phase coil group 14A has two types of coils 14A1 and 14A2 magnetized in the reverse direction and arranged alternately at a fixed pitch Pc. Note that with this specification, the two types of coils 14A1 and 14A2 of the A-phase coil group are jointly called the "A-phase coil group 14A." The same is also true for other coil groups and magnet groups.

The second coil group structure 20B comprises the support member 22B and the B-phase coil group 24B fixed to the support member 22B. This B-phase coil group 24B also has two types of coils 24B1 and 24B2 magnetized in the reverse direction and arranged alternately at a fixed pitch Pc.

The magnet group structure 30M comprises the support member 32M and the magnet group 34M fixed to the support member 32M. The permanent magnets 34M1 and 34M2 of this magnet group 34M are respectively arranged so that the magnetization direction is oriented in a direction perpendicular to the alignment direction of the magnetic group 34M (the left-right direction in FIG. 1(A)). The magnets of the magnet group 34M are arranged at a fixed pitch Pm.

Note that the A-phase coil group 14A and the B-phase coil group 24B are arranged at positions for which the electrical angles differ by an amount of $\pi/2$. The A-phase coil group 14A and the B-phase coil group 24B only differ in terms of position, and regarding other points, have substantially the same constitution. Therefore, following, the description will be made only for the A-phase coil group except in cases when it is specifically necessary when giving a description regarding the coil groups.

FIG. 1 (B) shows an example of the waveform of the alternating current drive signal supplied to the A-phase coil group 14A and the B-phase coil group 24B. Two-phase alternating current signals are respectively supplied to the A-phase coil group 14A and the B-phase coil group 24B. Also, the phases of the drive signals of the A-phase coil group 14A and the B-phase coil group 24B are mutually shifted by an amount of $\pi/2$. The status in FIG. 1 (A) correlates to the status when the phase is zero (or $2\pi$).

The electric motor of this comparative example further comprises a phase sensor 16A for the A-phase coil group 14A and a phase sensor 26B for the B-phase coil group 24B. These are called the "A-phase sensor" and the "B-phase sensor" hereafter. The A-phase sensor 16A is disposed at the position in the center between the two coils of the A-phase coil group 14A, and the B-phase sensor 26B is disposed at the position in the center between the two coils in the B-phase coil group 24B. As these sensors 16A and 26B, it is preferable to use sensors having analog output having the same waveform as the alternating current drive signal shown in FIG. 1 (B), and it is possible to use a Hall IC which uses the Hall effect, for example. However, it is possible to use a sensor having a square shaped digital output. It is also possible to omit the position sensor and perform sensorless drive.

Figure 2A:
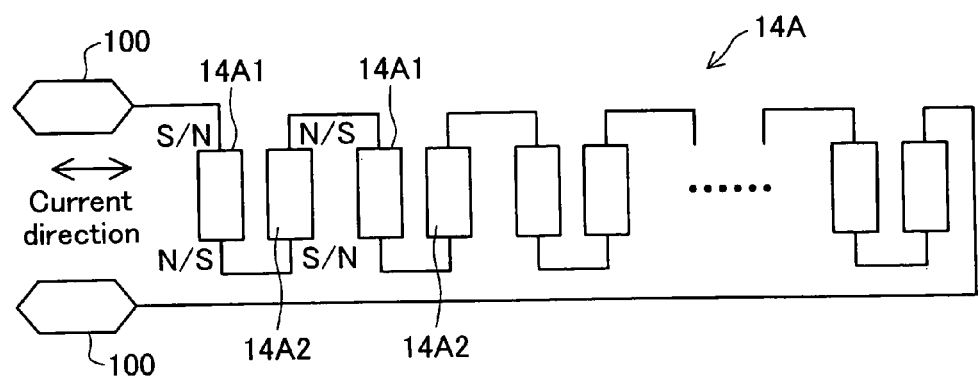
FIGS. 2 (A) and 2 (B) are drawings showing examples of the coil connection method.
Figure 2B:
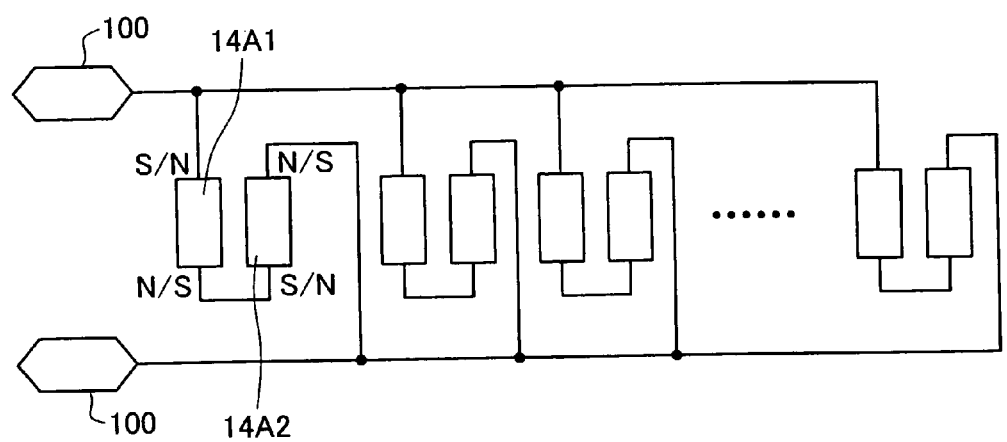
Figure 3A:
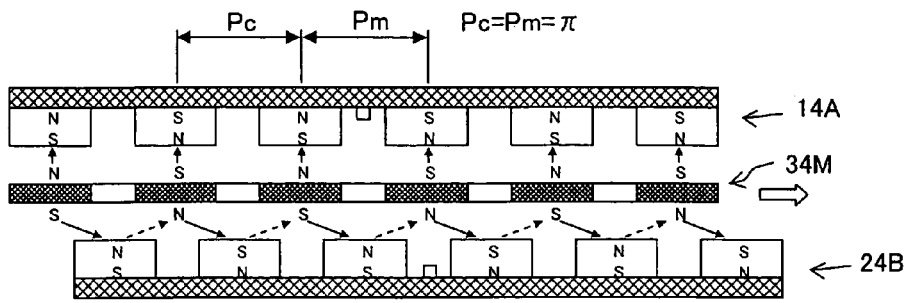
FIGS. 3 (A) to 3 (D) are drawings showing the operation of the electric motor of the comparative example.
Figure 3B:
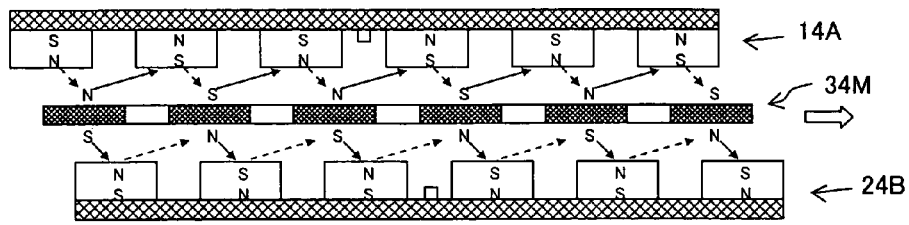
Figure 3C:
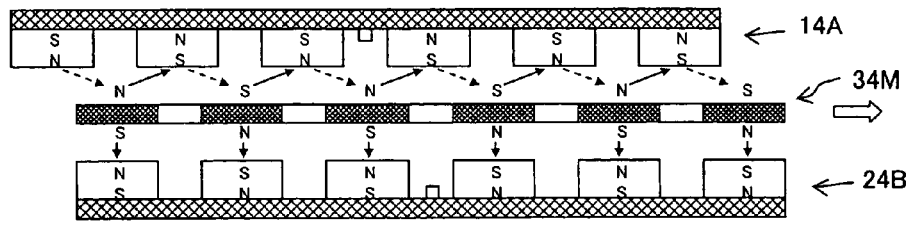
Figure 3D:
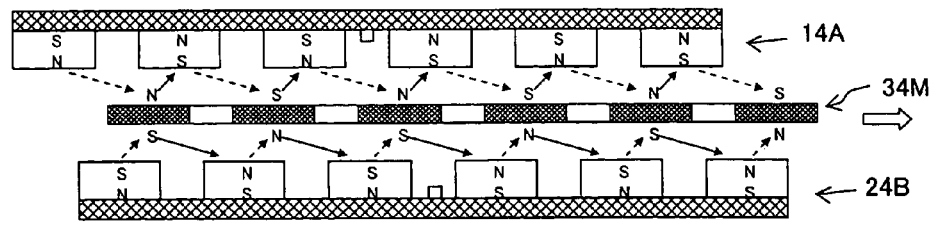

FIGS. 2 (A) and 2 (B) are drawings showing the connection method of the two types of coils 14A1 and 14A2 of the A-phase coil group 14A. With the connection method in FIG. 2 (A), all the coils included in the A-phase coil group 14A are serially connected to the drive control unit 100. Meanwhile, with the connection method in FIG. 2 (B), a plurality of serial connections composed of a pair of coils 14A1, 14A2 are connected in parallel. In the case of either of these connection methods, the two types of coils 14A1 and 14A2 are always magnetized to the reverse polarity. Note that it is also possible to use other connection methods besides these.

FIGS. 3 (A) to 3 (D) show the operation of the electric motor of the comparative example. Note that with this comparative example, the coil groups 14A and 24B are constituted as a stator, and the magnet group 34M is constituted as a rotor. Therefore, with FIGS. 3 (A) to 3 (D), the magnet group 34M moves together with the elapsing of time.

FIG. 3 (A) shows the status of the timing immediately before the phase is $2\pi$. Note that the solid line arrow drawn between the coil and the magnet indicates the attraction force direction, and the dotted line arrow indicates the repulsive force direction. In this state, the A-phase coil group 14A does not give drive force in the operating direction (rightward direction in the drawing) to the magnet group 34M, and the magnetic force works in the direction of pulling the magnet group 34M to the A-phase coil group 14A. Therefore, it is preferable that the applied voltage to the A-phase coil group 14A be zero at the timing when the phase is $2\pi$. Meanwhile, the B-phase coil group 24B gives drive force in the operating direction to the magnet group 34M. Also, the B-phase coil group 24B gives not just attraction force but also repulsive force to the magnet group 34M, so the net force in the vertical direction (the direction perpendicular to the operating direction of the magnet group 34M) from the B-phase coil group 24B to the magnet group 34M is zero. Therefore, it is desirable to have the applied voltage to the B-phase coil group 24B be the peak value at the timing when the phase is 2π.

As shown in FIG. 3 (B), the polarity of the A-phase coil group 14A is reversed at the timing when the phase is 2π. FIG. 3 (B) shows the status when the phase is π/4, and the polarity of the A-phase coil group 14A is reversed from FIG. 3 (A). In this state, the A-phase coil group 14A and the B-phase coil group 24B give the same drive force in the operating direction of the magnet group 34M. FIG. 3 (C) shows the state immediately before the phase is π/2. With this state, conversely to the state of FIG. 3 (A), only the A-phase coil group 14A gives drive force in the operating direction to the magnet group 34M. The polarity of the B-phase coil group 24B reverses at the timing when the phase is π/2, resulting in the polarity shown in FIG. 3 (D). FIG. 3 (D) shows the state when the phase is 3π/4. In this state, the A-phase coil group 14A and the B-phase coil group 24B give the same drive force in the operating direction of the magnet group 34M.

As can be understood from FIGS. 3 (A) to 3 (D), the polarity of the A-phase coil group 14A is switched at the timing when each coil of the A-phase coil group 14A faces each magnet of the magnet group 34M. The same is true for the B-phase coil group as well. As a result, it is possible to almost always generate drive force from all the coils, so it is possible to generate a large torque.

Note that the operation when the phase is between π and 2π is almost the same as that shown in FIGS. 3 (A) to 3 (D), so a detailed description is omitted. The polarity of the A-phase coil group 14A reverses again at the timing when the phase is π, and the polarity of the B-phase coil group 24B reverses again at the timing when the phase is 3π/2.

As can be understood from the description above, the electric motor of the comparative example is able to obtain drive force in the operating direction for the magnet group 34M by using the attraction force and the repulsion force between the coil groups 14A and 24B and the magnet group 34M.

However, with the electric motor of this comparative example, a number of problems like those below were found.

First, with the electric motor of the comparative example, force is generated in the direction perpendicular to the operating direction, and this force may cause oscillation or noise. Specifically, with the status in FIGS. 3 (A) and 3 (C), the sum of the perpendicular direction force generated between the A-phase coil group 14A and the magnet group 34M and the perpendicular direction force generated between the B-phase coil group 24B and the magnet group 34M is not zero, so there is an upward or a downward net force working. As a result, oscillation or noise may be caused by this upward or downward force.

Second, with the constitution of the comparative example, it is possible to omit one of either the A-phase coil group 14A and the B-phase coil group 24B, but in that case, there is the problem that a neutral position is generated at which the electric motor cannot start up. For example, when the B-phase coil group 24B is omitted, the operating direction (left-right direction) force between the A-phase coil group 14A and the magnet group 34M is not generated in the state of FIG. 3 (A). Therefore, when the electric motor is stopped at this position (neutral position), an effective drive force is not generated, so it is not possible to start up the electric motor. In this way, with the constitution of the comparative example, to make it always possible to start up the electric motor, it is necessary to have both the two coil groups 14A and 24B provided at both sides of the magnet group 34M.

The embodiments described below are constituted so as to address at least part of these problems of the comparative example.

B. First Embodiment (Two-Phase Motor)

B-1. Schematic Structure of the First Embodiment

Figure 4A:
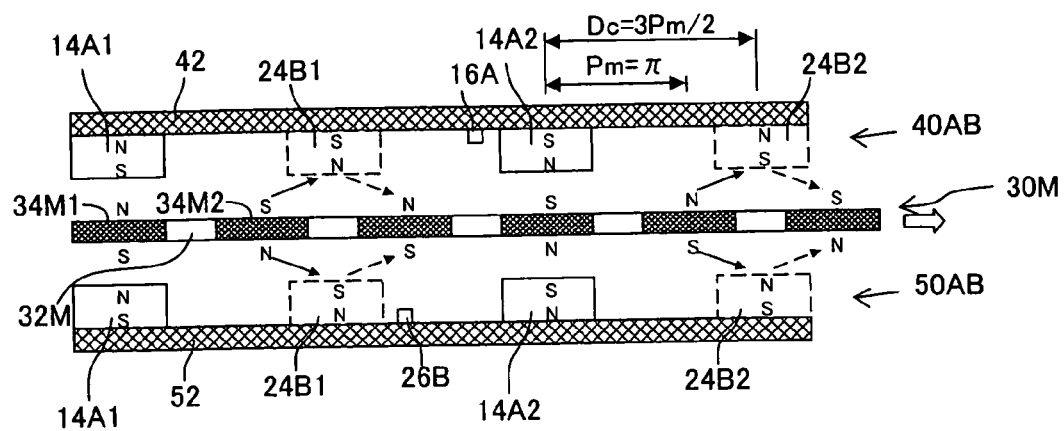
FIGS. 4 (A) and 4 (B) are explanatory drawings showing the electric motor schematic structure and the alternating current drive signal of the first embodiment of the present invention.
Figure 4B:
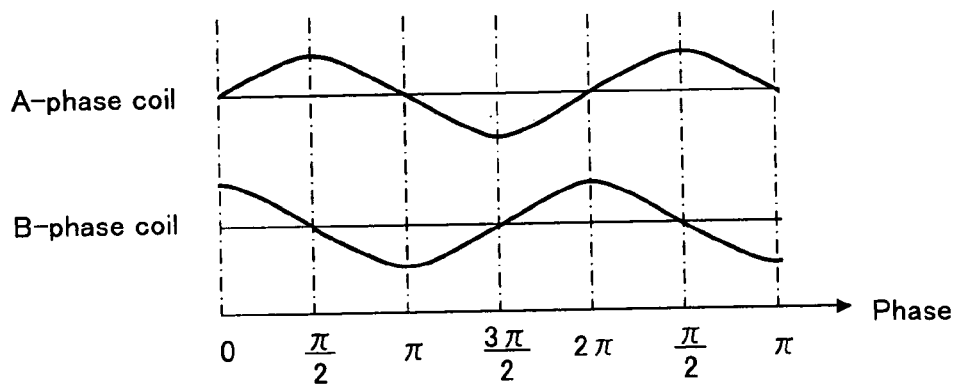
Figure 5A:
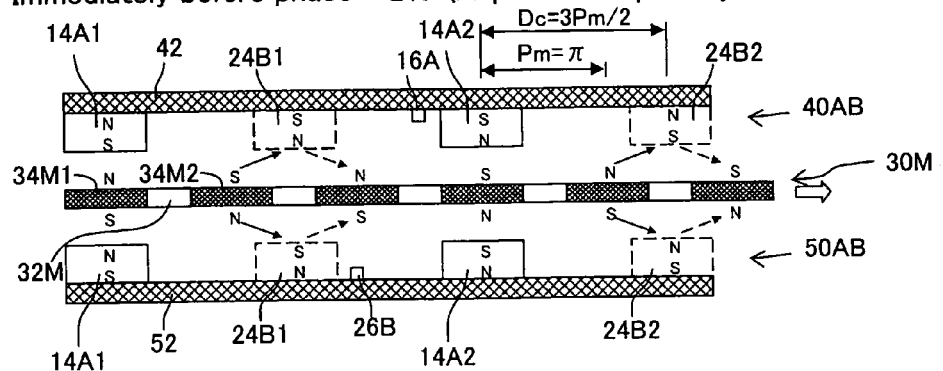
FIGS. 5 (A) to 5 (D) are drawings showing the operation of the electric motor of the first embodiment of the present invention.
Figure 5B:
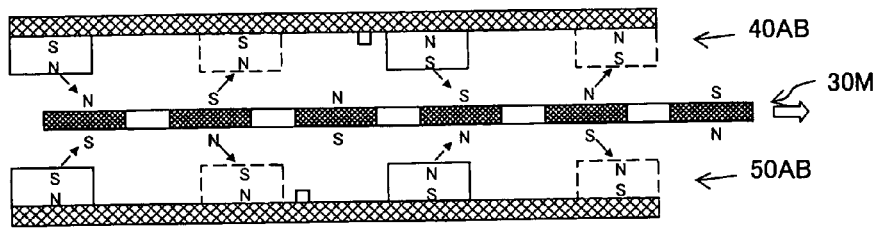
Figure 5C:
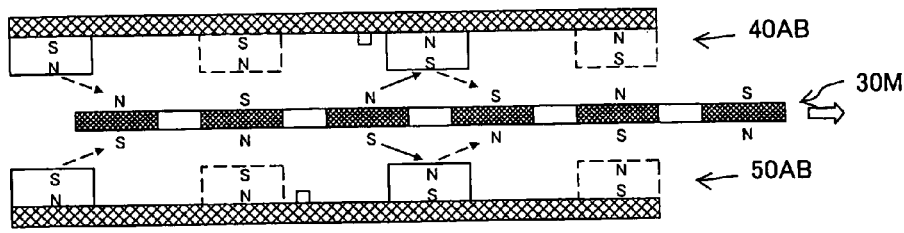
Figure 5D:
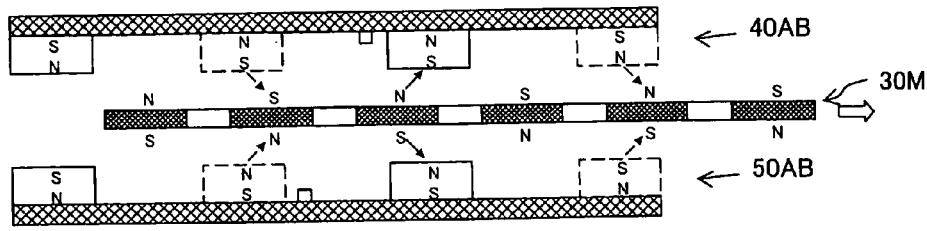

FIG. 4 (A) is an explanatory drawing showing the schematic structure of the electric motor of the first embodiment of the present invention. This electric motor comprises a first coil group structure 40AB, a second coil group structure 50AB, and a magnet group structure 30M.

The first coil group structure 40AB comprises a support member 42, an A-phase sub coil group 14A, and a B-phase sub coil group 24B. Note that with FIG. 4 (A), for convenience of illustration, the coils of the A-phase sub coil group are drawn with a solid line, and the coils of the B-phase sub coil group are drawn with a dotted line.

The A-phase sub coil group 14A has two types of reverse direction magnetized coils 14A1 and 14A2 arranged alternately at a fixed pitch. The B-phase sub coil group 24B similarly has two types of reverse direction magnetized coils 24B1 and 24B2 arranged alternately at a fixed pitch. The A-phase sub coil group 14A and the B-phase sub coil group 24B are arranged alternately at a fixed sub coil group interval Dc. Here, the sub coil group interval Dc means the distance between the coil centers. The pitch between the two types of coil 14A1 and 14A2 of the A-phase sub coil group 14A is 2 times this sub coil group interval Dc. The pitch between the two types of coil 24B1 and 24B2 of the B-phase sub coil group 24B is also 2 times the sub coil group interval Dc.

The second coil group structure 50AB comprises the support member 52, the A-phase sub coil group 14A, and the B-phase sub coil group 24B. The A-phase sub coil group 14A of the first coil group structure 40AB and the A-phase sub coil group 14A of the second coil group structure 50AB are arranged at position facing each other across the magnet group structure 30M. The same is true for the B-phase sub coil group 24B.

The magnet group structure 30M comprises the support member 32M, and the magnet group 34M fixed to the support member 32M. The permanent magnets 34M1 and 34M2 of this magnet group 34M are respectively arranged so that the magnetization direction is oriented in the direction perpendicular to the alignment direction (the left-right direction of FIG. 4 (A)) of the magnet group 34M. Note that it is also possible to omit the support member 32M and to create a unified structure magnet group constituted only by a plurality of the magnets 34M1 and 34M2. As this kind of magnet group, for example, it is also possible to use an irregular shaped magnetic substance for which bumps and dents repeatedly appear respectively on the top surface and the bottom surface, constituting a unified structure magnet for which the magnetic pole is formed on the bump part.

The magnets of the magnet group 34M are arranged at a fixed magnetic pole pitch Pm. With this specification, the magnetic pole pitch Pm means the distance correlating to π for the electrical angle. Note that the electrical angle of 2π is correlated to the mechanical angle or distance for which the phase of the motor drive signals changes by an amount of 2π. As shown in FIG. 4 (A), when the N poles and the S poles are arranged alternately, the magnetic pole pitch Pm is equal to the pitch of the magnets. Meanwhile, as described later, when only the N poles or only the S poles are arranged, the magnetic pole pitch Pm is ½ the pitch of the magnets. With the example in FIG. 4 (A), the magnetic pole pitch Pm and the sub coil group interval Dc have the relationship Dc=3Pm/2. Generally with the electric motor, when the phase of the coil drive signals changes by an amount of $2\pi$, there is movement by a distance correlating to 2 times the magnetic pole pitch Pm. Therefore, with the electric motor of the first embodiment, when the coil drive signal phase is changed by an amount of $2\pi$, the magnet group structure 30M moves by an amount 2Pm=4Dc/3.

Generally, it is preferable to establish a relationship of Dc=Pm(K/M). Here, M is an integer of 2 or greater, indicating the phase count of the electric motor. Embodiments with M=3, and M=4 will be described later. K is an integer other than integral multiples of M. The reason that the case when K is an integral multiple of M is excluded is that in this case, there is generated a neutral position for which the electric motor cannot be started. For example, if the sub coil group interval Dc is reduced so that Dc=Pm in FIG. 4 (A), each coil and magnet completely face each other. and drive force is not generated in the operating direction (left-right direction), so startup is not possible from this position.

Furthermore, it is preferable that the integers K and M do not have a common multiple other than 1. The reason for this is that if K and M have a common multiple N other than 1, it can be thought that the actual phase count of the electric motor would be M/N. For example, when K=6 and M=4, this is constituted as a four-phase electric motor, but this can be considered to be a two-phase electric motor for which K=3 and M=2.

Also, the phase count M of the electric motor is preferable to be approximately 2 to 5, and more preferable to be 2 to 3. The reason for this is that when the phase count M is high, the circuit for generating the drive signals for driving the M sets of sub coil groups becomes large.

FIG. 4 (B) shows an example of the waveforms of the alternating current drive signals supplied to the A-phase coil group 14A and the B-phase coil group 24B for the first embodiment. The phases of the drive signals of the A-phase coil group 14A and the B-phase coil group 24B are shifted from each other by $3\pi/2$. This phase difference corresponds to the sub coil group interval Dc=3Pm/2. Generally, the phase difference between sub coil groups is a value $\pi(K/M)$ which corresponds to the sub coil group interval Dc.

As shown in FIG. 4 (A), this electric motor includes the A-phase sensor 16A and the B-phase sensor 26B. With this example, the A-phase sensor 16A is disposed at the first coil structure 40AB, and the B-phase sensor is disposed at the second coil structure 50AB, but the two sensors 16A and 26B may be disposed at either of the two support members 42 and 52. The A-phase sensor 16A is disposed such that the A-phase sensor 16A comes to the center position between the magnet N pole and S pole in the state in which each coil of the A-phase sub coil group 14A is opposed to one of the magnets 34M1 and 34M2 (FIG. 4 (A)). Meanwhile, the B-phase sensor 26B is disposed such that the B-phase sensor 26B comes to the center position between the magnet N pole and S pole in the state, due to the movement of the magnet group structure 30M, in which each coil of the B-phase sub coil group 24B is opposed to one of the magnets 34M1 an 34M2. As these sensors 16A and 26B, it is possible to use sensors having analog output having the same waveforms as the alternating drive signals shown in FIG. 4 (B), and it is also possible to use sensors having square waveform digital output. It is also possible to omit the position sensors and perform sensorless drive.

The coil connection methods shown in FIGS. 2 (A) and 2 (B) can be used for each sub coil group 14A and 24B.

The support members 32M, 42, and 52 are preferably each formed using a non-magnetic material. Also, of the various types of members of the electric motor of this embodiment, it is preferable that all the members other than the electric wiring including the coils and sensors, the magnets, the rotation axis, and the bearing part be formed by non-magnetic and non-conductive materials. More specifically, it is possible to use various types of non-magnetic, non-conductive materials as the rotor member, the bobbin member (core member), and the case member. However, the rotor member (magnet group support member 32M), taking strength into consideration, may be made of metal materials such as aluminum, its alloys, and the like. In this case as well, the bobbin member and case member are preferably formed of substantially non-magnetic, non-conductive material. Here, "substantially non-magnetic, non-conductive material" means that it is allowed to have small portion of a magnetic material or conductive material. For example, whether or not the bobbin member is formed of an substantially non-magnetic, non-conductive material can be determined by whether or not there is cogging in the motor.

Also, whether or not the case member is substantially formed of a non-conductive material can be determined by whether or not the core loss (eddy current loss) due to the case member is a specified value (e.g. 1% of input) or less.

Note that in the electric motor structural members, there are some members which are preferably fabricated from a metal material such as the rotation axis and the bearing. Here, "structural members" means members used for supporting the shape of the electric motor, and means major parts that do not include small parts, fixtures, or the like. The rotor member and the case member are structural members. With the electric motor of the present invention, it is preferable that the major structural members other than the rotation axis and the bearing be formed of non-magnetic, non-conductive materials.

FIGS. 5 (A) to 5 (D) show the operation of the electric motor of the first embodiment. Note that with the first embodiment, the coil group structures 40AB and 50AB are constituted as a stator, and the magnet group structure 30M is constituted as a rotor. Therefore, with FIGS. 5 (A) to 5 (D), the magnet group structure 30M moves with the elapsing of time.

FIG. 5 (A) shows the state of the timing immediately before the phase is $2\pi$. Note that the solid line arrow drawn between the coil and the magnet indicates the attraction force direction, and the dotted line arrow indicates the repulsion force direction. In this state, the net force (force sum) from the A-phase sub coil group 14A to the magnet group 34M is zero. Therefore, it is preferable that the application voltage to the A-phase sub coil group 14A be zero at the timing when the phase is $2\pi$. Meanwhile, the B-phase sub coil group 24B gives drive force in the moving direction of the magnet group 34M. Also, the net force of the vertical direction (the direction perpendicular to the moving direction of the magnet group 34M) from the B-phase sub coil group 24B to the magnet group 34M is zero. Therefore, it is preferable that the application voltage to the B-phase sub coil group 24B be at its peak value at the timing when the phase is $2\pi$.

As shown in FIG. 4 (B) described previously, the polarity of the A-phase sub coil group 14A is reversed at the timing when the phase is $2\pi$. FIG. 5 (B) shows the state when the phase is $\pi/4$, and the polarity of the A-phase sub coil group 14A is reversed from that of FIG. 5 (A). In this state, the A-phase sub coil group 14A and the B-phase sub coil group 24B give the same drive force in the moving direction of the magnet group 34M. FIG. 5 (C) shows the state immediately before the phase is $\pi/2$. With this state, contrary to the state shown in FIG. 5 (A), only the A-phase sub coil group 14A gives drive force in the moving direction of the magnet group 34M. The polarity of the B-phase sub coil group 24B reverses at the timing when the phase is $\pi/2$, becoming the polarity shown in FIG. 5 (D). FIG. 5 (D) shows the state when the phase is $3\pi/4$. With this state, the A-phase sub coil group 14A and the B-phase sub coil group 24B give the same drive force in the moving direction of the magnet group 34M.

As can be understood from FIGS. 5 (A) to 5 (D), the polarity of the A-phase sub coil group 14A switches at the timing when each coil of the A-phase sub coil group 14A is opposed to one magnet of the magnet group 34M. The same is also true for the B-phase sub coil group. As a result, it is possible to almost always generate drive force from all the coils, so it is possible to generate a large torque.

Note that the operation when the phase is between $\pi$ and $2\pi$ is almost the same as that shown in FIGS. 5 (A) to 5 (D), so a detailed description is omitted. However, the polarity of the A-phase sub coil group 14A is reversed at the timing when the phase is $\pi$, and the polarity of the B-phase sub coil group 24B is reversed at the timing when the phase is $3\pi/2$.

As can be understood from the description above, the electric motor of the first embodiment obtains drive force in the moving direction of the magnet group 34M by utilizing the attraction force and the repulsion force between the sub coil groups 14A and 24B and the magnet group 34M.

Figure 6A:
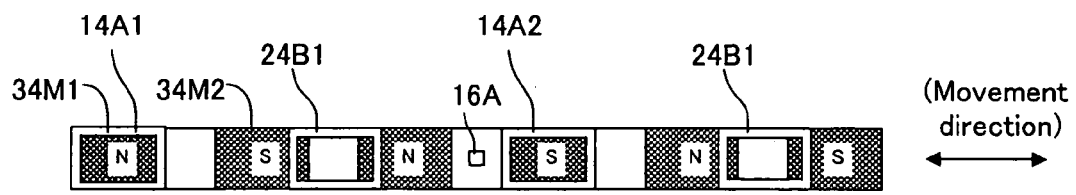
FIGS. 6 (A) and 6 (B) are drawings showing examples of the planar arrangement of the magnets M and the coils.
Figure 6B:
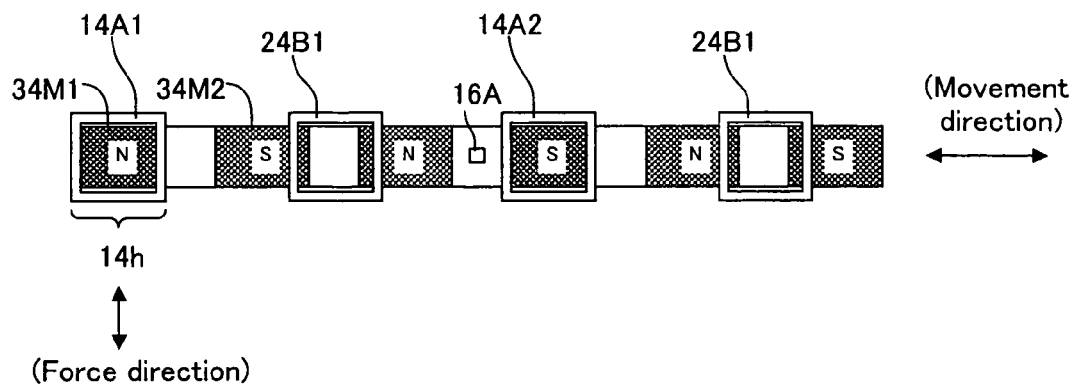

FIG. 6 (A) shows an example of the planar arrangement of the magnets 34M1 and 34M2 and the coils 14A1, 14A2, 24B1, and 24B2. With this example, the peripheral width of each coil approximately matches the peripheral width of the magnet. However, it is possible to make the magnet dimensions smaller than those of the coil, and conversely to make them larger than those of the coil. FIG. 6 (B) shows another example of the planar arrangement of the magnets and coils. With this example, the coil vertical width (the vertical direction dimension in the drawing) is set to be larger than that of the example in FIG. 6 (A). The example in FIG. 6 (A) has the advantage of being able to make the overall dimensions somewhat smaller. Meanwhile, the example in FIG. 6 (B) has the advantage of smaller useless force to the coils in the directions other than the moving direction. Specifically, for example in the coil 14A1, the coil part 14h outside the magnet 34M1 does not receive a force in the moving direction, but receives a force in the direction perpendicular to the moving direction. This can be understood from Fleming's left hand rule. Therefore, as shown in FIG. 6 (B), if the coil part 14h is arranged at an outside position displaced from directly above or directly below the magnet 34M1, the magnetic flux density of this coil part 14h becomes smaller, so it is possible to make this kind of useless force smaller.

B-2. Circuit Configuration of the First Embodiment

Figure 7:
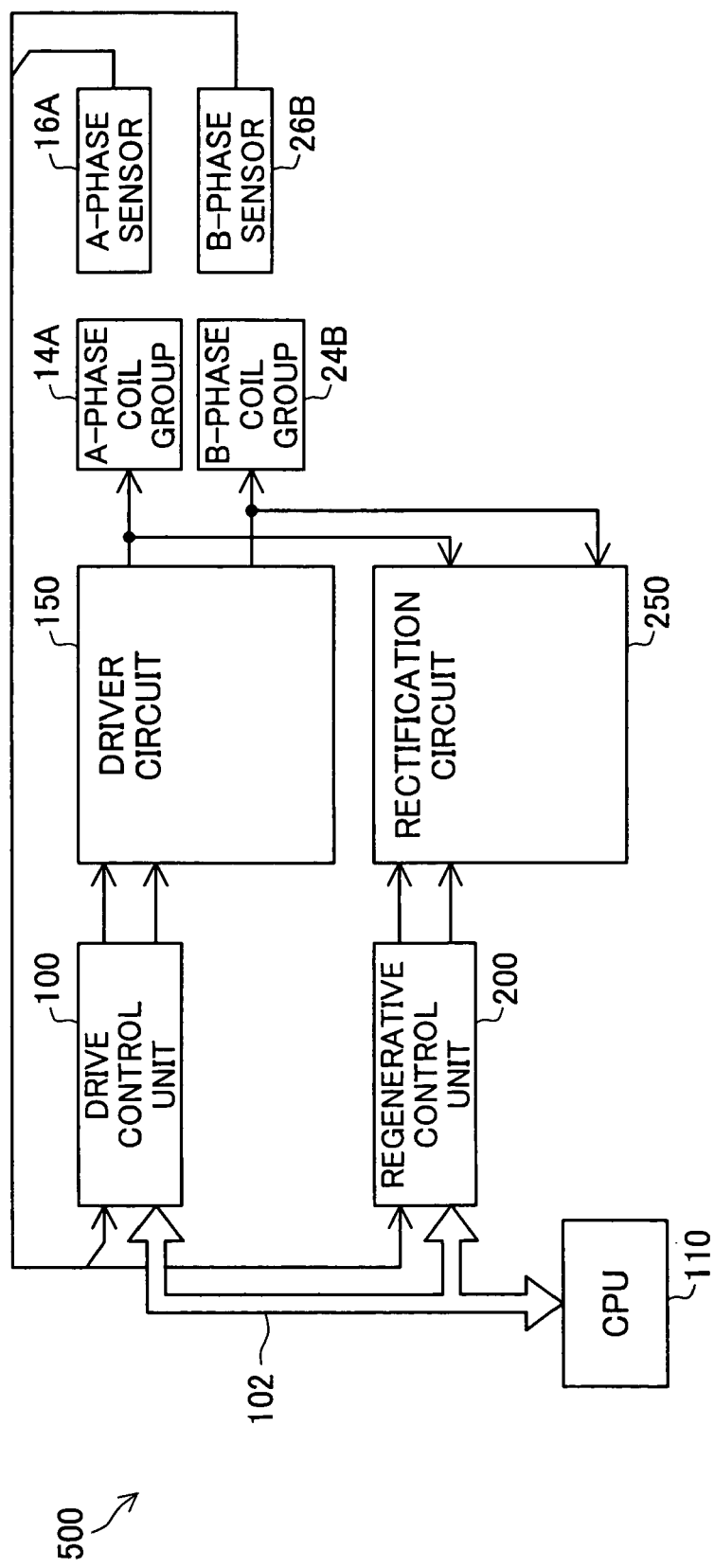
FIG. 7 is a block diagram showing the constitution of the drive circuit unit.

FIG. 7 is a block diagram showing the internal structure of the driver circuit unit for the first embodiment. This drive circuit unit 500 comprises a CPU 110, a drive control unit 100, a regenerative control unit 200, a driver circuit 150, and a rectification circuit 250. The two control units 100 and 200 are connected with the CPU 110 via a bus 102. The drive control unit 100 and the driver circuit 150 are circuits for performing control when drive force is generated at the electric motor. Also, the regenerative control unit 200 and the rectification circuit 250 are circuits for performing control when electric power is regenerated from the electric motor. The regenerative control unit 200 and the rectification circuit 250 are together called the "regenerative circuit." Also, the drive control unit 100 is also called the "drive signal generating circuit."

Figure 8:
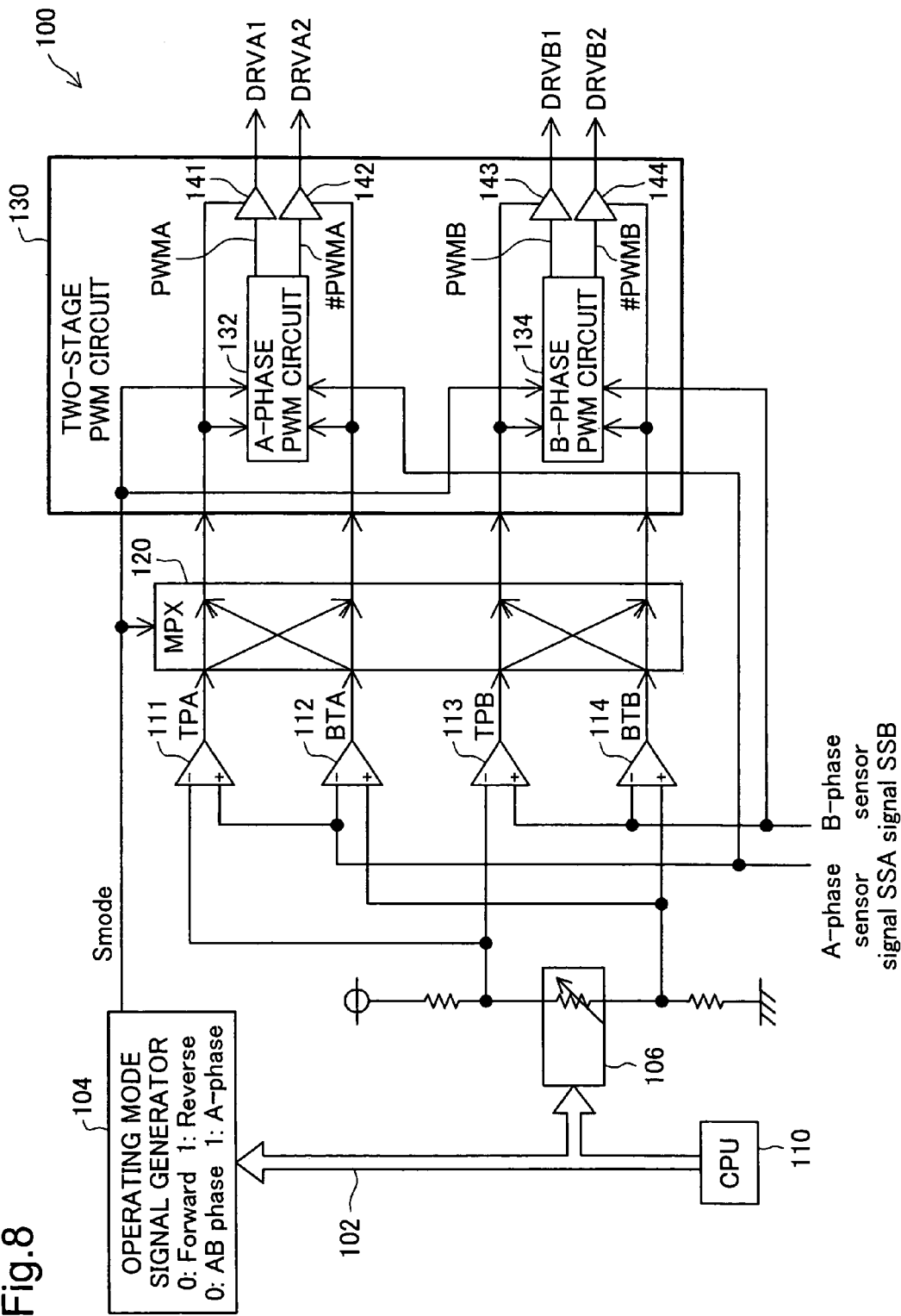
FIG. 8 is a block diagram showing the constitution of the drive control unit.

FIG. 8 shows the constitution of the drive control unit 100. This circuit 100 comprises an operating mode signal generator 104, an electronic variable resistor 106, and a CPU 110 connected to the bus 102. The operating mode signal generator 104 generates an operating mode signal Smode. The operating mode signal Smode includes a first bit indicating either forward rotation or reverse rotation, and a second bit indicating either an operating mode using both the A and B phases or another operating mode using only the A phase. Note that at the time of motor startup, the two sub coil groups A-phase and B-phase are used to securely determine the rotation direction. However, after the motor operation starts, in an operating state when the required torque is low, it is possible to continue sufficient rotation even using only one of the A-phase sub coil group or the B-phase sub coil group. The second bit of the operating mode signal Smode is a flag for instructing driving only of the A-phase sub coil group in this kind of case.

The voltages at the opposite ends of the electronic variable resistor 106 are given to one input terminal of the four voltage comparators 111 to 114. The A-phase sensor signal SSA and the B-phase sensor signal SSB are supplied to the other input terminals of the voltage comparators 111 to 114. The output signals TPA, BTA, TPB, and BTB of the four voltage comparators 111 to 114 are called "mask signals" or "enable signals." The meanings of these names are described later.

The mask signals TPA, BTA, TPB, and BTB are input to a multiplexer 120. The multiplexer 120 can reverse the motor by switching the output terminals of the A-phase mask signals TPA and BTA and by switching the output terminals of the B-phase mask signals TPB and BTB according to the operating mode signal Smode. The mask signals TPA, BTA, TPB, and BTB output from the multiplexer 120 are supplied to a two-stage PWM circuit 130.

The two-stage PWM circuit 130 comprises an A-phase PWM circuit 132, a B-phase PWM circuit 134, and four three state buffer circuits 141 to 144. Supplied to the A-phase PWM circuit 132 are the A-phase sensor 16A (FIG. 4 (A)) output signal SSA (hereafter called "A-phase sensor signal") and the operating mode signal Smode. Supplied to the B-phase PWM circuit 134 are the B-phase sensor 26B output signal SSB and the operating modes signal Smode. These two PWM circuits 132 and 134 are circuits for generating the PWM signals PWMA, #PWMA, PWMB, and #PMWM according to the sensor signals SSA and SSB. Note that the signals #PMWA and #PMWB are signals that are the reverse of the signals PMWA and PMWB. As described previously, the sensor signals SSA and SSB are both sine wave signals, and the PWM circuits 132 and 134 execute well-known PWM operations according to these sine wave signals.

The signals PWMA and #PWMA generated by the A-phase PWM circuit 132 are supplied respectively to the two input terminals of the two three state buffer circuits 141 and 142. Supplied to the control terminals of these three state buffer circuits 141 and 142 are the A-phase mask signals TPA and BTA given from the multiplexer 120. The output signals DRVA1 and DRVA2 of the three state buffer circuits 141 and 142 are A-phase sub coil group drive signals (hereafter called "A1 drive signal" and "A2 drive signal"). Similarly for the B-phase as well, the B-phase sub coil group drive signals DRVB1 and DRVB2 are generated by the PWM circuit 134 and the three state buffer circuits 143 and 144.

Figure 9:
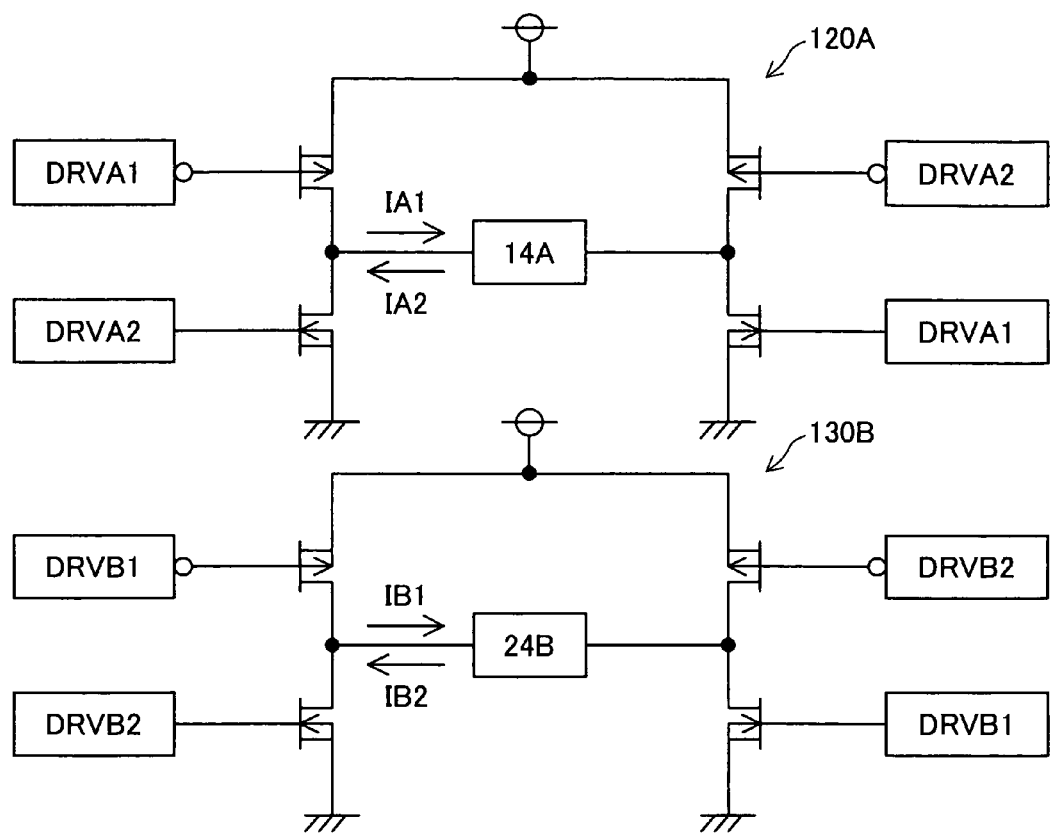
FIG. 9 is a block diagram showing the constitution of the driver circuit.

FIG. 9 shows the constitution of the A-state driver circuit 120A and the B-phase driver circuit 130B contained in the driver circuit 150 (FIG. 7). The A-phase driver circuit 120A is an H-bridge circuit for supplying the alternating circuit drive signals DRVA1 and DRVA2 to the A-phase sub coil group 14A. Note that the white circles marking the terminal parts of the block indicating the drive signals indicate that this is negative logic and the signals are reversed. Also, the arrows marked by the reference symbols IA1 and IA2 respectively indicate the direction in which current flows by the A1 drive signal DRVA1 and the A2 drive signal DRVA2, respectively. The constitution of the B-phase driver circuit 130B is also the same as the constitution of the A-phase driver circuit 12A.

Figure 10:
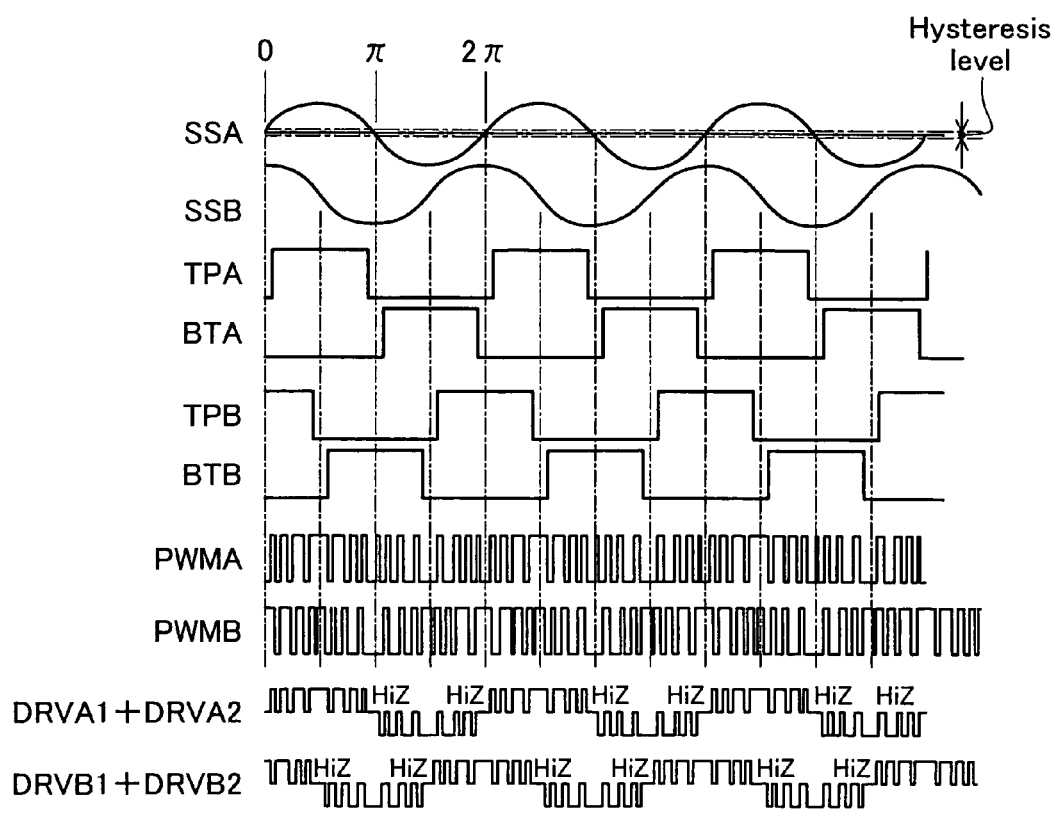
FIG. 10 is a timing chart showing the signal waveform during large torque generation of the motor of the first embodiment.

FIG. 10 is a timing chart showing various signal waveforms in the first embodiment. The A-phase sensor signal SSA and the B-phase sensor signal SSB are sine waves for which the phase is shifted by $3\pi/2$. The A-phase PWM circuit 132 generates the signal PWMA (the seventh signal from the top in FIG. 10) having an average voltage proportional to the level of the A-phase sensor signal SSA. The first A-phase mask signal TPA enables application of the signal PWMA to the A-phase sub coil group 14A during the time that this signal TPA is at H level, and prohibits the application during the time it is at L level. Similarly, the second A-phase mask signal BTA also enables the application of the signal PWMA to the A-phase sub coil group 14A during the time that this signal BTA is at H level, and prohibits the application during the time it is at L level. However, the first A-phase mask signal TPA becomes H level when the PWM signal PWMA is on the plus side, and the second A-phase mask signal BTA becomes H level when the PWM signal PWMA is on the minus side. As a result, the drive signal DRVA1+DRVA2 such as that shown at the second from the bottom in FIG. 10 is applied to the A-phase sub coil group 14A. As can be understood from this description, it is possible to think of the A-phase mask signals TPA and BTB as signals enabling the application of the PWM signal PWMA to the A-phase sub coil group 14A, and also to think of them as signals that mask the PWM signal PWMA and does not supply them to the A-phase sub coil group 14A. The same is also true for the B-phase.

Note that FIG. 10 shows the operating state when large torque is generated. In this operation state, both of the mask signals TPA and BTA have a small time duration when the level is L, and therefore, for almost all of the time, voltage is applied to the A-phase sub coil group 14A. Note that at the right end of the waveform of the A-phase sensor signal SSA is shown the hysteresis level at this time. Here, the "hysteresis level" means the range of ineffective (that is, those that are not used) signal levels in the vicinity of the zero level of the sine signal. When large torque is generated, we can see that the hysteresis level is extremely small. Note that the hysteresis level can be modified by changing the resistance of the electronic variable resistor 106, thereby changing the duty of the mask signals TPA, BTA, TPB, and BTB.

Figure 11:
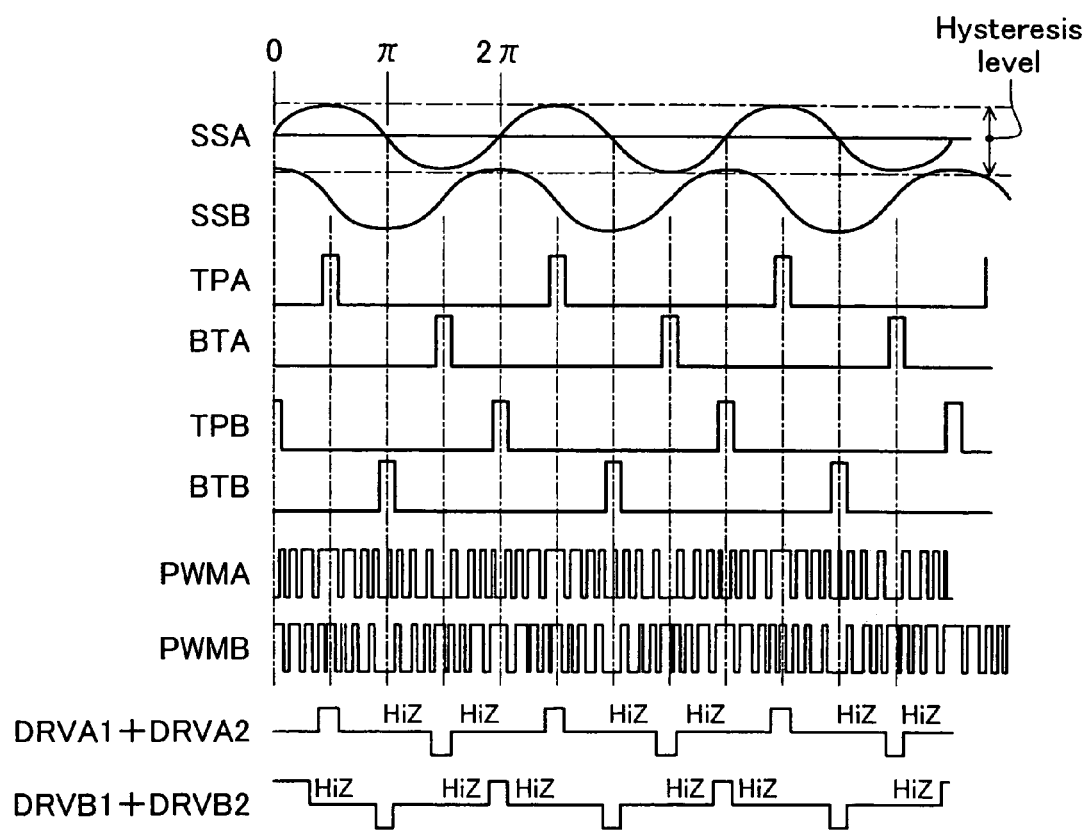
FIG. 11 is a timing chart showing the signal waveform during small torque generation of the motor of the first embodiment.

FIG. 11 shows the operating state when a small torque is generated.

Note that small torque means that the rotation is high. At this time, the duty of the mask signals TPA, BTA, TPB, and BTB are set smaller than in FIG. 8, and the pulse count of the drive signals (DRVA1+DRVA2) and (DRVB1+DRVB2) of each coil is reduced accordingly. The hysteresis level is also large.

Note that as can be understood by comparing FIG. 10 and FIG. 11, the time during which the first A-phase mask signal TPA is H level has a symmetrical shape with the center as the timing at which the A-phase sensor SSA indicates a maximum value (the point at which the phase is $\pi/2$). Similarly, the time during which the second A-phase mask signal BTA is H level has a symmetrical shape with the center as the timing at which the A-phase sensor signal SSA indicates a minimum value (the point at which the phase is $3\pi/2$). In other words, it can be thought that the masking interval of the PWM signal PWMA is set so that the signal PWMA is masked within a time interval centered on the timing ($\pi$ and $2\pi$) at which the polarity of the AC drive signal (waveform shown in FIG. 4(B)) simulated by the signal PWMA is inverted.

However, as described with reference to FIG. 4 (A), the A-phase sub coil group 14A does not generate very effective drive force when the phase is near $2\pi$. The same is true when the phase is near $\pi$ as well. Also, the A-phase sub coil group 14A generates effective drive force most efficiently when the phase is near $\pi/2$ and $3\pi/2$. As shown in FIG. 11 described above, the two-stage PWM circuit 130 of this embodiment does not apply voltage to the A-phase sub coil group 14A when the phase is near $\pi$ and $2\pi$ when the motor request output is small. Also, as shown in FIG. 10 and FIG. 11, voltage is applied to the A-phase sub coil group 14A during time periods whose center corresponds to the phase of near $\pi/2$ or $3\pi/2$. In this way, the A-phase mask signals TPA, BTA mask the PWM signal PWMA so as to use preferentially an interval in which the A-phase coil group 14A generates the drive force with the highest efficiency. Therefore, the motor efficiency can be increased. These circumstances are the same in relation to the B-phase sub coil group 24B as well. As shown in FIG. 4 (B), with the B-phase sub coil group 24B, the polarity is reversed at the timing when the phase is $\pi/2$ and $3\pi/2$, so it is preferable not to have voltage applied to the B-phase sub coil group 24B when the phase is near $\pi/2$ and $3\pi/2$.

Figure 12:
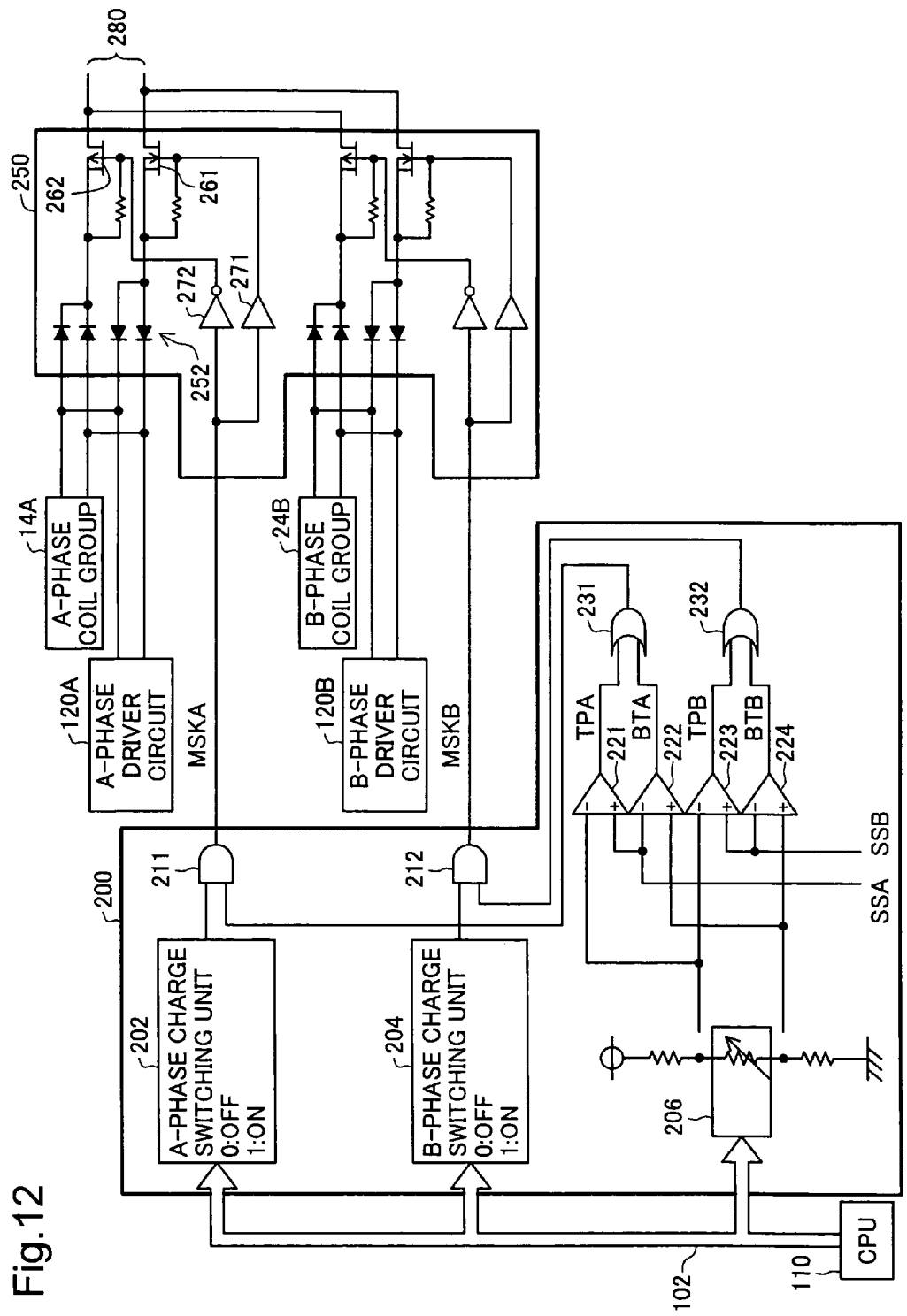
FIG. 12 is a drawing showing the internal constitution of the regenerative control unit and the driver circuit for relative deceleration.
Figure 13A:
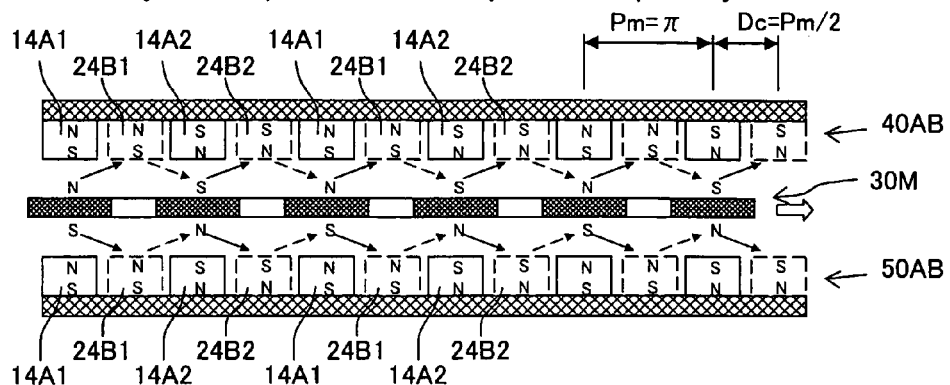
FIGS. 13 (A) to 13 (D) are drawings showing the constitution and the operation of the first variation example of a two-phase motor.
Figure 13B:
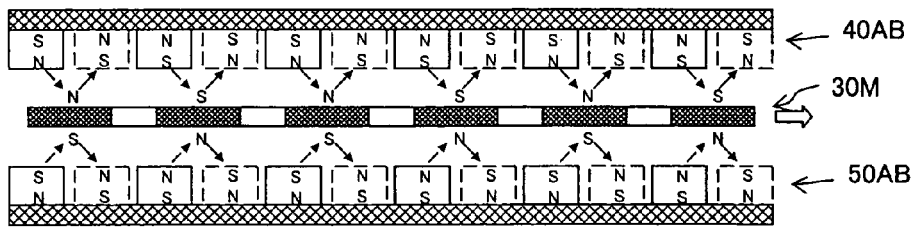
Figure 13C:
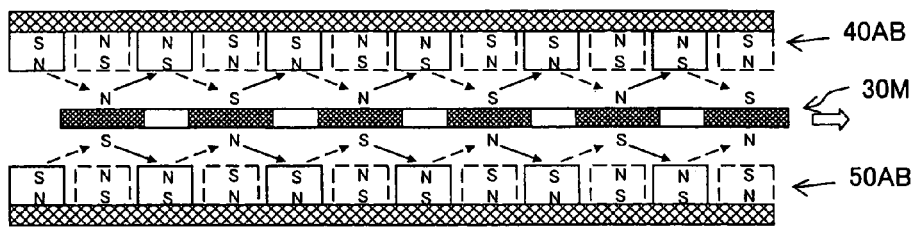
Figure 13D:
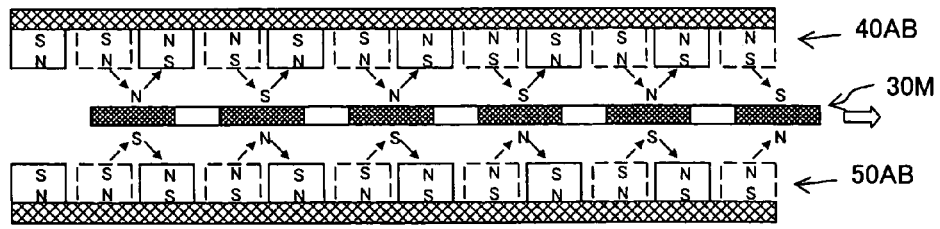

FIG. 12 is a drawing showing the internal structure of the regenerative control unit 200 and the rectification circuit 250. The regenerative control unit 200 comprises an A-phase charge switching unit 202, a B-phase charge switching unit 204, and an electronic variable resistor 206 connected to the bus 102. The output signals of the two charge switching units 202 and 204 are given to the input terminals of two AND circuits 211 and 212.

The A-phase charge switching unit 202 outputs a level "1" signal when the regenerated power is recovered from the A-phase sub coil group 14A, and outputs a level "0" signal when it is not recovered. The same is also true for the B-phase charge switching unit 204. Note that the switching of these signal levels is performed by the CPU 110. Also, the presence or absence of the regeneration from the A-phase sub coil group 14A and the presence or absence of the regeneration from the B-phase sub coil group 24B can be set independently. Therefore, it is also possible to regenerate power from the B-phase sub coil group 24B while generating drive force at an actuator using the A-phase sub coil group 14A, for example.

Note that the drive control unit 100 similarly may be constituted such that whether or not drive force is generated using the A-phase sub coil group 14A and whether or not drive force is generated using the B-phase sub coil group 24B may also be set independently. For example, it is possible to constitute the operating mode signal generator 104 in FIG. 8 so that the generator 104 outputs the signal indicating the presence or absence of drive of the A-phase sub coil group 14A and the signal indicating the presence or absence of drive of the B-phase sub coil group 24B. In this way, it is possible to operate the electric motor in an operating mode in which a drive force is generated with either one of the two coil groups 14A and 24B while electric power is regenerated with the other.

The voltage of both ends of the electronic variable resistor 206 is given to one of the two input terminals of the four voltage comparators 221 to 224. The A-phase sensor signal SSA and the B-phase sensor signal SSB are supplied to the other input terminal of the voltage comparators 221 to 224. The output signals TPA, BTA, TPB, and BTB of the four voltage comparators 221 to 224 can be called "mask signals" or "enable signals."

The A-phase coil mask signals TPA and BTA are input to the OR circuit 231, and the B-phase mask signals TPB and BTB are input to the other OR circuit 232. The output of these OR circuits 231 and 232 is given to the input terminals of the two AND circuits 211 and 212 described above. The output signals MSKA and MSKB of these AND circuits 211 and 212 are also called "mask signals" and "enable signals."

Incidentally, the constitutions of the electronic variable resistor 206 and the four voltage comparators 221 to 224 are the same as the constitutions of the electronic variable resistor 106 and the four voltage comparators 111 to 114 of the drive control unit 100 shown in FIG. 8. Therefore, the output signal of the A-phase coil OR circuit 231 corresponds to a logical sum of the mask signals TPA and BTA shown in FIG. 10. Also, when the output signal of the A-phase charge switching unit 202 is level "1," the mask signal MSKA output from the A-phase coil AND circuit 211 is the same as the output signal of the OR circuit 231. These operations are also the same for the B-phase.

The rectification circuit 250 comprises as the A-phase coil circuitry a full wave rectification circuit 252 containing a plurality of diodes, two gate transistors 261 and 262, a buffer circuit 271, and an inverter circuit 272 (NOT circuit). Note that the same circuits are provided for the B-phase as well. The gate transistors 261 and 262 are connected to regeneration power supply wiring 280.

The alternating current power generated by the A-phase sub coil group 14A during power regeneration is rectified by the full wave rectification circuit 252. The A-phase coil mask signal MSKA and its reverse signal are given to the gates of the gate transistors 261 and 262. Therefore, during the time that at least one of the mask signals TPA and BTA output from the voltage comparators 221 and 222 is at H level, the regenerated power is output to the power supply wiring 280, and meanwhile, during the time that both the mask signals TPA and BTA are L level, power regeneration is prohibited.

As can be understood from the description above, it is possible to recover the regenerated power using the regenerative control unit 200 and the rectification circuit 250. Also, the regenerative control unit 200 and the rectification circuit 250 can limit the time for recovery of regenerated power from the A-phase sub coil group 14A and the B-phase sub coil group 24B according to the A-phase coil mask signal MSKA and the B-phase coil mask signal MSKB, and by doing this it is possible to adjust the volume of regenerated power. However, it is also possible to omit the regenerative control unit 200 and the rectification circuit 250.

As described above, with the electric motor of the first embodiment, there is absolutely no provision of a metal substance core, so cogging does not occur, making it possible to realize smooth, stable operation. Also, a yoke is not provided for constituting the magnetic circuits, so there is very little so-called core loss (eddy current loss) making it possible to realize an efficient motor. Furthermore, with the first embodiment, two coil groups 40AB and 50AB are arranged on opposite sides across the magnet group 34M, so it is possible to use the magnetic flux of both sides of the magnet group 34M to generate drive force. Therefore, the magnetic flux use efficiency is high compared to conventional electric motors using only one side of the magnet group for generating drive force, making it possible to realize an electric motor with high torque with good efficiency.

Also, with the first embodiment, the same sub coil groups 14A and 24B are respectively provided to the two coil groups 40AB and 50AB, and the sub coil group interval Dc between the sub coil groups 14A and 24B is set to 3/2 times a magnetic pole pitch Pm, so there is no neutral position for which effective drive force is not generated, and it is possible to always start the electric motor in the desired operating direction (forward or reverse).

C. Two-phase Motor Structure Variation Examples

FIGS. 13 (A) to 13 (D) show the operation of the first variation example of the two-phase motor. As shown in FIG. 13 (A), the coils 14A1, 24B1, 14A2, and 24B2 are repeatedly arranged in this sequence in the first coil group structure 40AB, and this point is the same as the first embodiment shown in FIG. 4 (A). However, with the first variation example, the sub coil group interval Dc is a half of the magnetic pole pitch Pm(=π), which is one third of the sub coil group interval of the first embodiment. For the sub coil group interval Dc and the magnetic pole pitch Pm relationship formula of Dc=Pm(K/M), the first variation example correlates to when K=1 and M=2. The second coil group structure 50AB also has the same constitution as the first coil group structure 40AB.

The operation of FIGS. 13 (A) to 13 (D) is basically the same as the operation of FIGS. 5 (A) to 5 (D), so a detailed description is omitted. The two-phase motor of this first variation example is also able to achieve the same effects as the first embodiment.

Figure 14A:
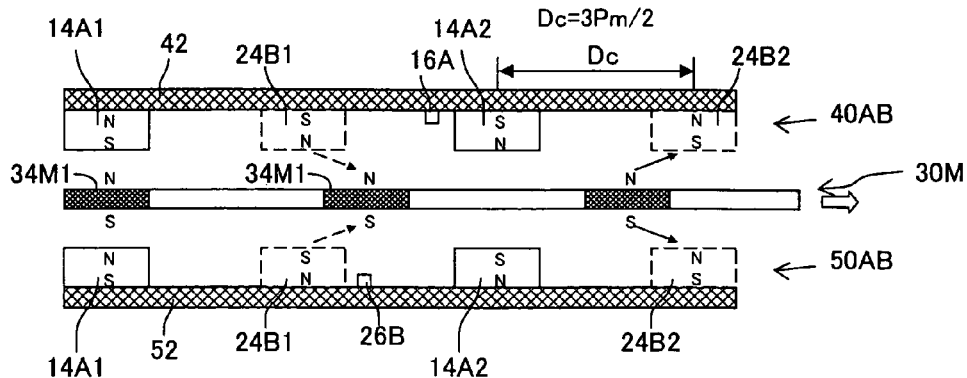
FIGS. 14 (A) to 14 (C) are drawings showing another variation example of a two-phase motor.
Figure 14B:
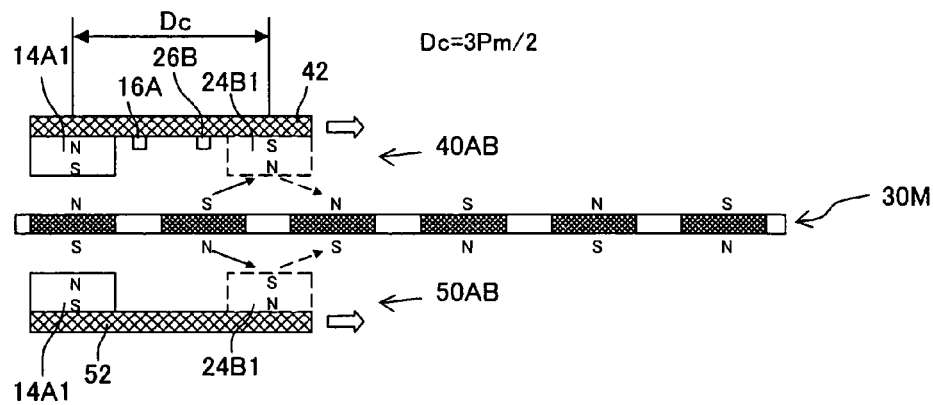
Figure 14C:
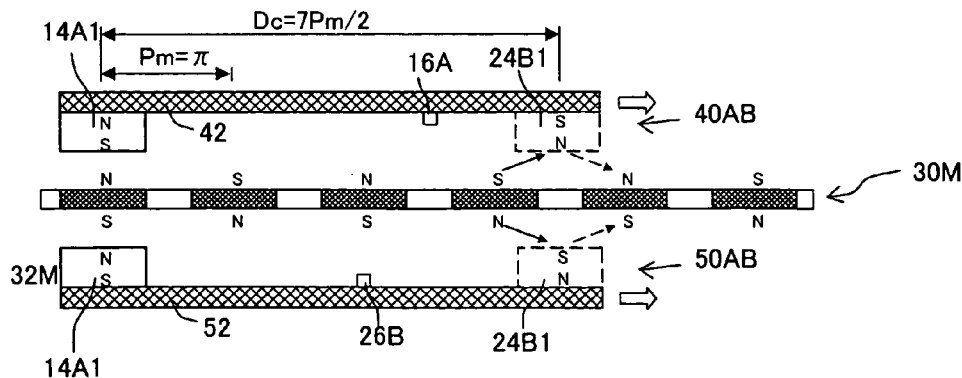

FIG. 14 (A) shows a second variation example of the two-phase motor. The second variation example omits the magnets 34M2 from the constitution of the first embodiment (FIG. 4 (A)), but the other points are the same as the first embodiment. Specifically, the magnet group structure 30M for the second variation example is constituted only by a plurality of magnets 34M1 having the same direction polarity. In this case, the pitch between the magnets 34M1 correlate to 2π of the electrical angle, so the magnetic pole pitch Pm is ½ the pitch between magnets. As can be understood from this example, the magnetic pole pitch Pm is a value that correlates not to a magnet pitch, but rather to a pitch between N pole and S pole. The operation of this second variation example is basically the same as the operation of the first embodiment.

FIG. 14 (B) shows a third variation example of the two-phase motor. Only one A-phase coil 14A1 and one B-phase coil 24B1 are arranged at the first coil group structure 40AB. The same is also true for the second coil group structure 50AB. With this second variation example, the magnet group structure 30M functions as a stator, and is constituted as a linear motor for which the two coil group structures 40AB and 50AB function as a slider. The sub coil group interval Dc is ³⁄₂ of the magnetic pole pitch Pm(=π), and is the same as the first embodiment. The linear motor of this third variation example can also achieve the same effects as the first embodiment.

FIG. 14 (C) shows a fourth variation example of the two-phase motor.

The fourth embodiment is modified from the third variation example so that the sub coil group interval Dc becomes ⅞ of the magnetic pole pitch Pm(=π), and the other points are the same as the third variation example.

As can be understood from the third and fourth variation examples, the A-phase coil group and the B-phase coil group can be constituted to respectively include one or more coils. It is also possible to constitute the magnet group so as to include one or more magnets. However, with a rotation type motor, it is preferable that the A-phase sub coil group and the B-phase sub coil group respectively include a plurality of coils, and that the magnet group include a plurality of magnets. Also, with the rotation type motor, it is preferable that the plurality of coils of the first coil group 40AB be arranged at equal intervals at a fixed pitch along the rotation direction. The same is also true of the second coil group 50AB. It is also preferable that the plurality of magnets of the magnet group 34M be arranged at equal intervals at a fixed pitch along the rotation direction.

Figure 15A:
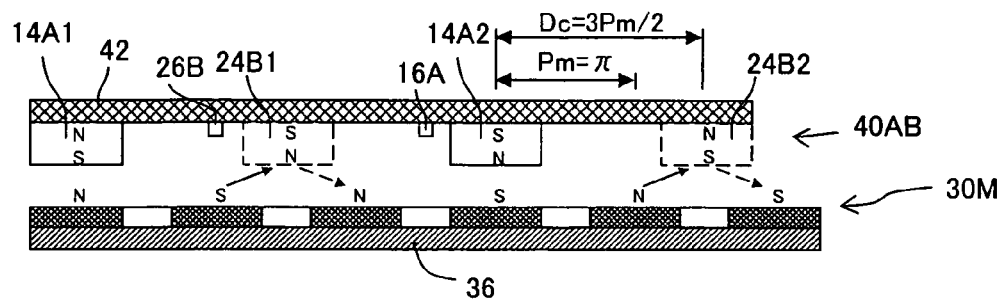
FIGS. 15 (A) and 15(B) are drawings showing yet another variation example of a two-phase motor.
Figure 15B:
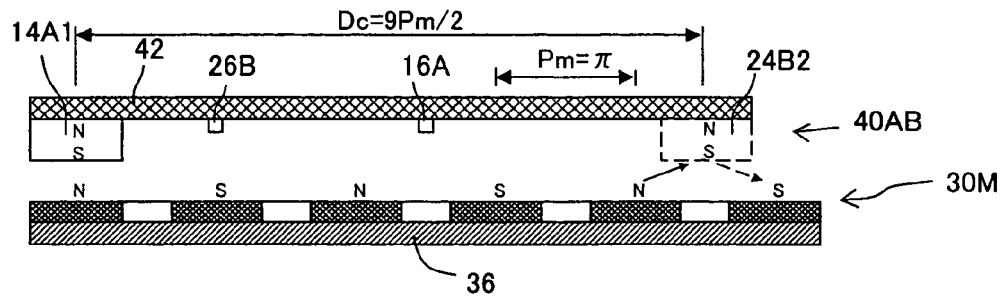

FIG. 15 (A) shows a fifth variation example of the two-phase motor. This fifth variation example omits the second coil group structure 50AB from the first embodiment, and the other constitution is the same as the first embodiment. The fifth variation example has a one sided arrangement structure for which only one coil group structure 40AB is provided at one side of the magnet group structure 30M. This point is a big difference from the point that with the first embodiment and the various variation examples described above, a both sided arrangement structure is used (a structure for which coil groups are respectively provided at both sides of the magnet group). Also, as shown in FIG. 15 (A), with the one sided arrangement structure, it is also possible to provide a yoke material 36 constituted by a magnetic substance at the back side of the magnet group structure 30M (opposite side to the coil group). By providing this kind of yoke material 36, it is possible to increase the magnetic flux density on the side facing the coil group structure 40AB of the magnet group structure 30M. Note that this kind of yoke material is not necessary with the both sided arrangement structure.

FIG. 15 (B) shows a sixth variation example of the two-phase motor. This sixth variation example is modified from the fifth variation example so that the sub coil group interval Dc is ½ of the magnetic pole pitch Pm(=π), and the other points are the same as the fifth variation example.

As can be understood from these several variation examples, it is possible to use various values other than an integral multiple of the phase count M as the value of K for the relationship formula Dc=Pm(K/M). As described previously, the reason that the case when K is an integral multiple of M is excluded is because in this case, a neutral position is generated for which startup of the electric motor is not possible.

D. Two-phase Motor Circuit Configuration Variation Examples

Figure 16:
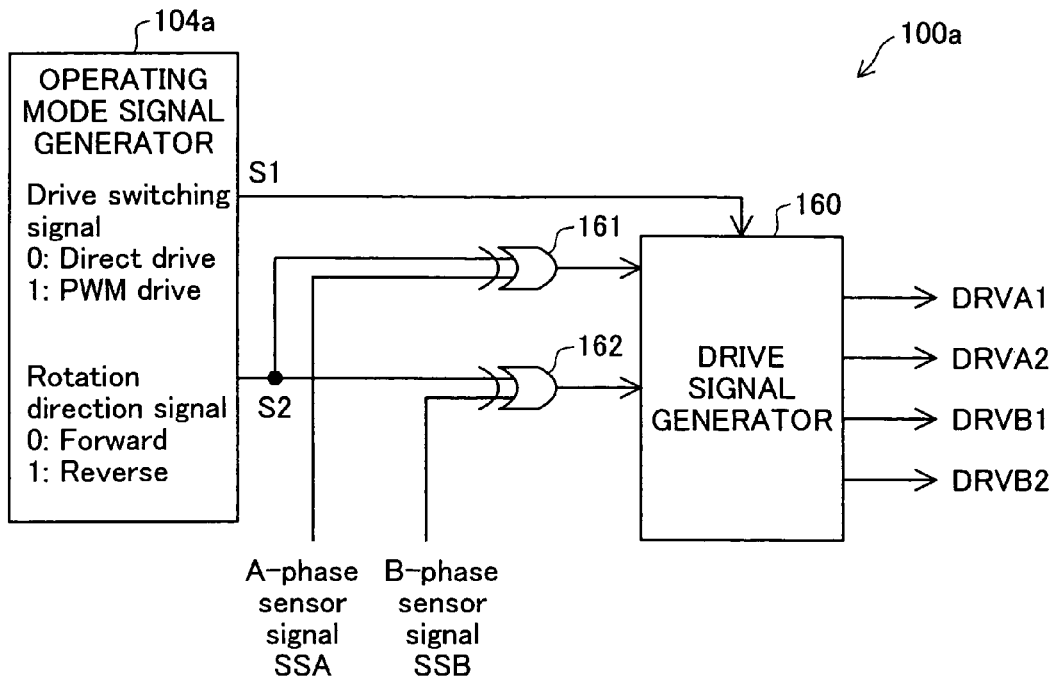
FIG. 16 is a block diagram showing a first variation example of the drive control unit.

FIG. 16 is a block diagram showing the first variation example of the drive control unit 100 (FIG. 8). This drive control unit 100a comprises an operating mode signal generator 104a, a drive signal generator 150, and two EXOR circuits 161 and 162. The operating mode signal generator 104a outputs a drive signal switching signal S1 and rotation direction signal S2 according to user instructions. The drive switching signal S1 is a signal for switching between the direct drive mode (described later) and the PWM drive mode. The rotation direction signal S2 is a signal for switching between forward and reverse. The rotation direction signal S2 is input together with the A-phase sensor signal SSA to the first EXOR circuit 161, and is input together with the B-phase sensor signal SSB to the second EXOR circuit 162. Note that here, the A-phase sensor and the B-phase sensor have a digital output. The drive signal generator 160 uses the output of the EXOR circuits 161 and 162 to generate the A-phase drive signals DRVA1 and DRVA2 and the B-phase drive signals DRVB1 and DRVB2.

Figure 17:
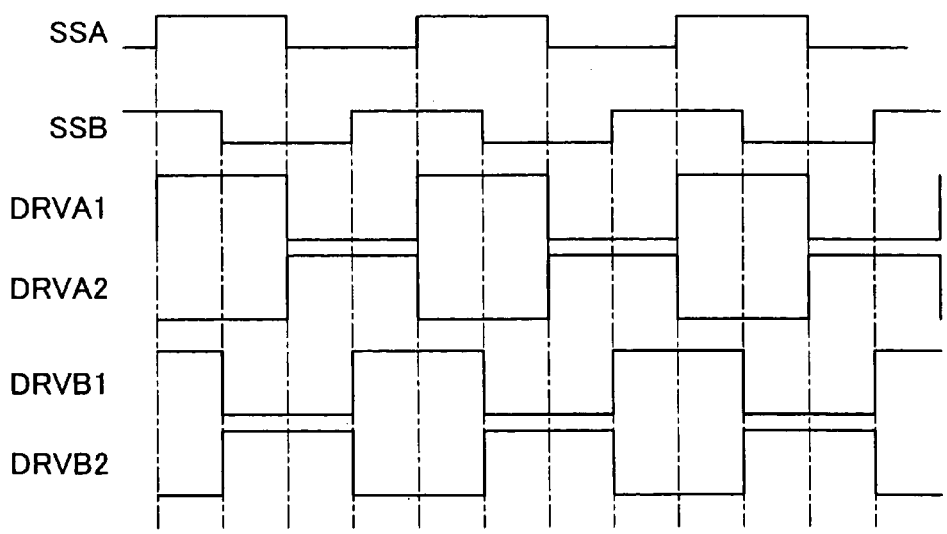
FIG. 17 is a timing chart showing the signal waveform when the drive signal generator is operated in the direct drive mode.

FIG. 17 shows the signal waveforms when the drive signal generator 160 operates in the direct drive mode. The A-phase drive signals DRVA1 and DRVA2 correspond to signals amplified from the A-phase sensor signal SSA, and the B-phase drive signals DRVB1 and DRVB2 correspond to signals amplified from the B-phase sensor signal SSB. As can be understood from this example, with the direct drive mode, the drive signals are generated using the sensor signal waveform as is.

The PWM drive mode is a mode for generating the same drive signals as in FIG. 10 and FIG. 11 described above. The circuit configuration for executing the PWM drive mode is almost the same as that shown in FIG. 8, so a detailed description is omitted.

Figure 18:
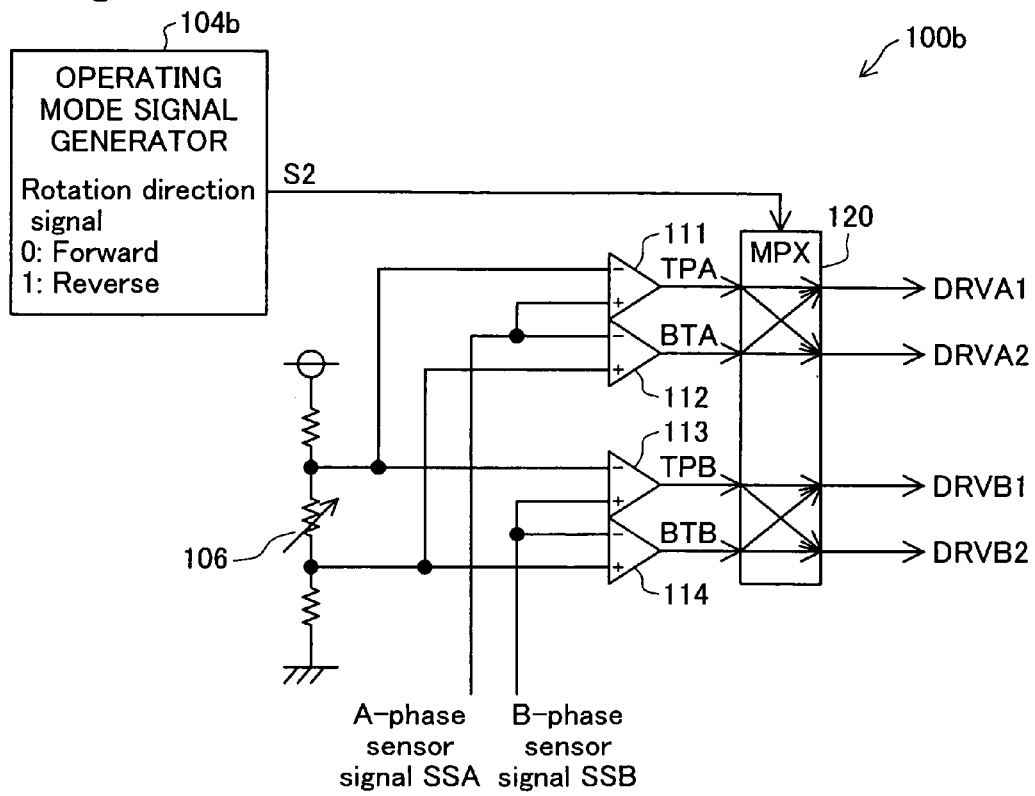
FIG. 18 is a block diagram showing a second variation example of the drive control unit.

FIG. 18 is a block diagram showing the second variation example of the drive control unit. This drive control unit 100b comprises an operating mode signal generator 104b, an electronic variable resistor 106, four voltage comparators 111 to 114, and a multiplexer 120. The operating mode signal generator 104b outputs the rotation direction signal S2 according to the user instructions. The electronic variable resistor 106, the four voltage comparators 111 to 114, and the multiplexer 120 are the same as these circuits shown in FIG. 8, and the drive signal generator is constituted by these circuits.

Figure 19:
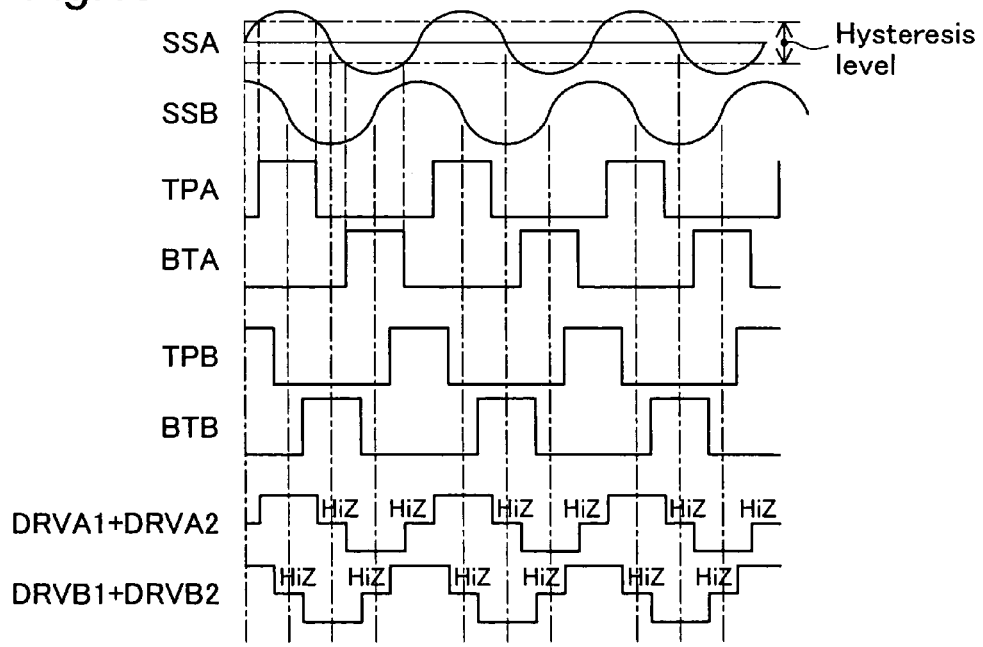
FIG. 19 is a timing chart showing the signal waveform of a second variation example of the drive control unit.

FIG. 19 is a timing chart showing the signal waveforms of the drive control unit 100b shown in FIG. 18. The operation of this drive control unit 100b is different from that shown in FIG. 10 and FIG. 11 in terms of the point that it does not use a PWM signal that simulates a sine wave, but the other points are substantially the same as FIG. 10 and FIG. 11. In FIG. 19 as well, it is possible to change the duty of the drive signals DRVA1, DRVA2, DRVB1, and DRVB2 according to the hysteresis level.

Figure 20:
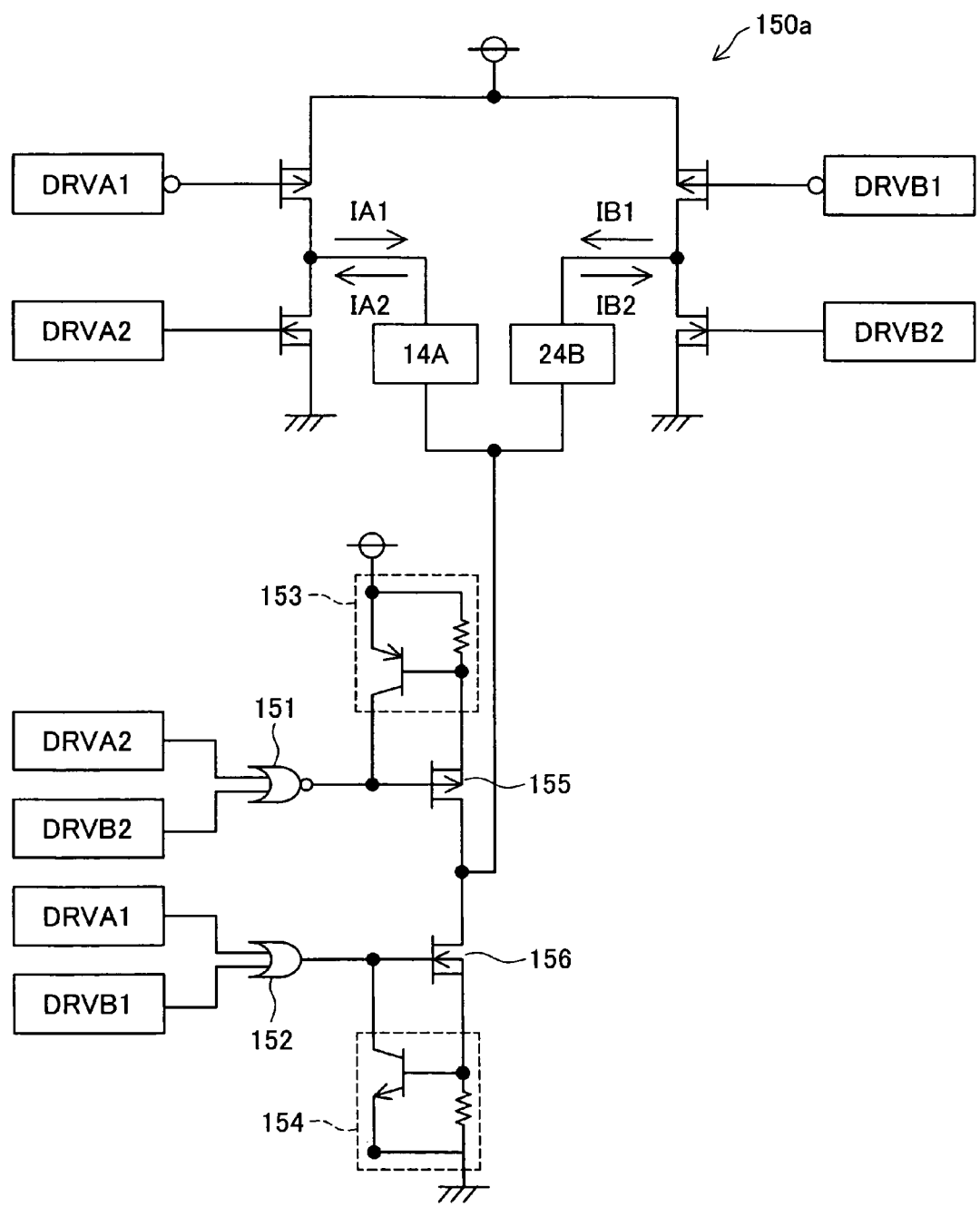
FIG. 20 is a block diagram showing a variation example of the driver circuit.

FIG. 20 is a block diagram showing a variation example of the driver circuit 150 shown in FIG. 9. This driver circuit 150a is simplified so that the A-phase and the B-phase share the two transistors on the right side of the two H-bridge circuits 120A and 130B of FIG. 9. The two shared transistors 155 and 156 are drawn on the bottom side of the drawing in FIG. 20. The outputs of the NOR circuit 151 and the OR circuit 152 are respectively input to the gates of these two transistors 155 and 156. The drive signals DRVA2 and DRVB2 are supplied to the input terminals of the NOR circuit 151. The drive signals DRVA1 and DRVB1 are supplied to the input terminals of the OR circuit 152. This circuit configuration can be understood as correlating to a combination of the two bridge circuits 120A and 130B shown in FIG. 9. Note that excess current prevention circuits 153 and 154 are respectively provided on the two transistors 155 and 156, but these may be omitted.

As shown in FIG. 16 to FIG. 20, it is possible to use various circuit configurations. It is also possible to use circuit configurations other than these.

E. Two-Phase Motor Application Examples

Figure 21A:
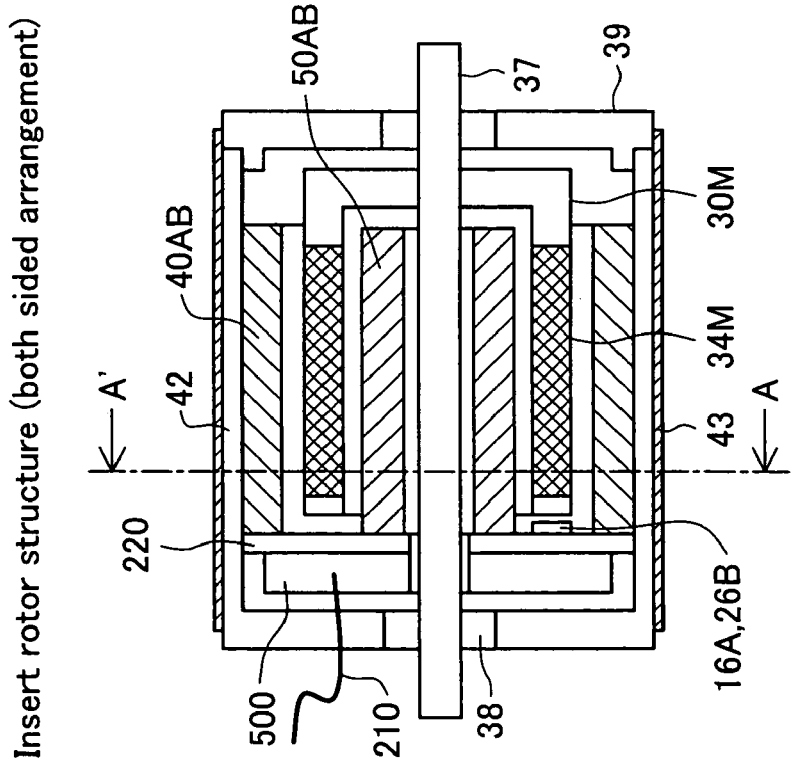
FIGS. 21 (A) and 21 (B) are cross section diagrams showing an example of the mechanical structure of a two-phase motor.
Figure 21B:
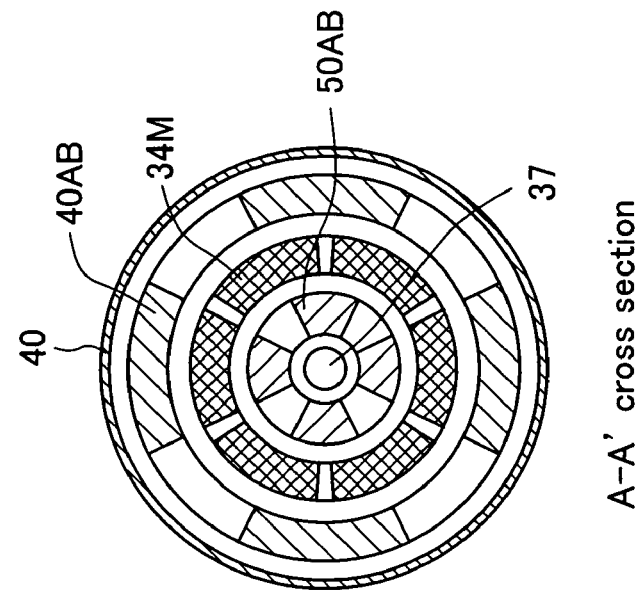

FIGS. 21 (A) and 21 (B) are cross section diagrams showing an example of the mechanical structure of a two-phase motor as an embodiment of the present invention. This two-phase motor has an insert rotor structure for which a roughly cylindrical shaped rotor 30M (magnet group structure) is inserted between the roughly cylindrical shaped dual structure stators 40AB and 50AB (coil group structures). Specifically, the two coil group structures 40AB and 50AB constitute two cylinder members constituting a hollow dual cylinder structure, and the magnet group structure 30M is constituted as another cylinder member inserted between the coil group structures 40AB and 50AB. In this way, a structure for which three hollow cylinder members are coaxially overlaid is hereafter also called a "hollow multiple cylinder structure."

FIGS. 22 (A) and 22 (B) show the rotor and stator separated. The stator shown in FIG. 22 (A) comprises two coil group structures 40AB and 50AB. The support member 42 of the coil group structure 40AB on the outside constitutes a hollow cylinder case. A magnetic shielding member 43 is provided on the outside of the cylinder surface of this case 42. This magnetic shielding member 43 is for preventing magnetic leaking to the outside of the motor, and is formed by a very thin ferromagnetic material (e.g. permalloy). However, the magnetic shielding member 43 does not have the function as a yoke for constituting a magnetic circuit. Note that whether or not a member used for the motor has a function as a yoke can be determined according to the coil surface magnetic flux density when there is and when there is not a magnetic shielding member. For example, if the coil surface magnetic flux density increases by 10% or more when the magnetic shielding member 43 is provided, it is determined that the member 43 functions as a yoke, and when it is less than 10%, it is possible to determine that the member 43 does not function as a yoke. Note that the criterion can be 5% rather than 10%.

The drive circuit unit 500 (FIG. 7) is provided on the substrate 200 within the stator. Power and control signals are supplied from the outside via the electrical wiring 210 to the drive circuit unit 500.

The rotor 30M comprises the magnet group 34M, and provided at the center is the axis 37. As shown in FIG. 22 (A), a bearing 38 is provided at the bottom surface of the left side of the stator. Also, as shown in FIG. 22 (B), a bearing 36 is provided also at the lid 39 for closing the case after insertion of the rotor 30M.

Note that with the example in FIG. 21 (B), the first coil group structure 40AB and the second coil group structure 50AB respectively comprise four coils, and the magnet group 34M comprises six magnets. However, it is possible to set the number of coils and magnets to another value. This two-phase motor comprises a hollow multiple cylinder structure, so there is the advantage that there is little rotor oscillation.

Figure 23A:
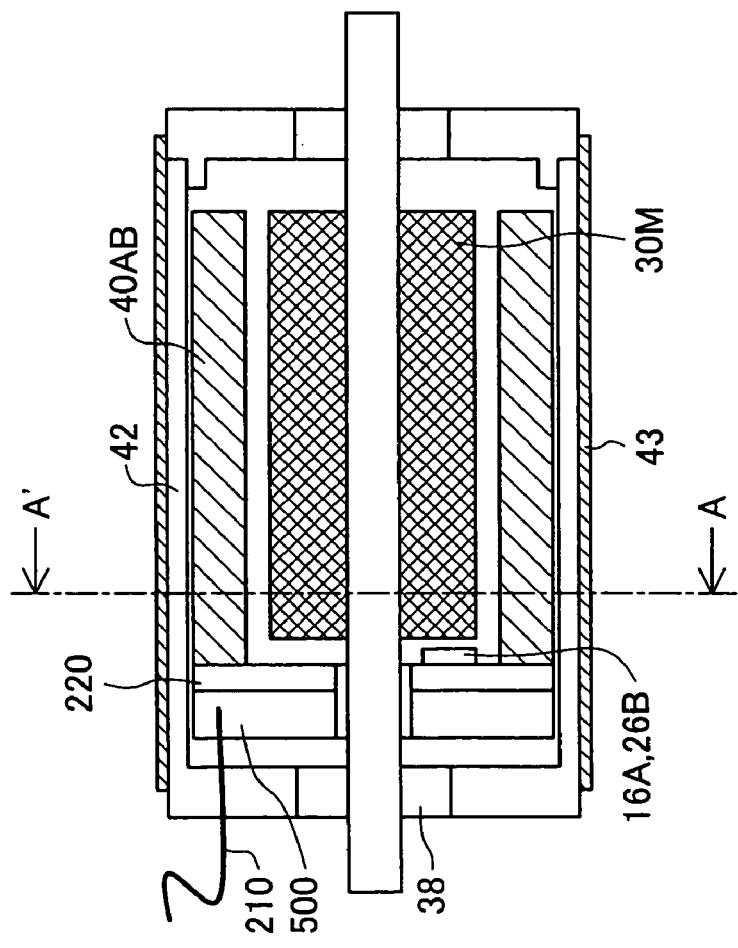
FIGS. 23 (A) and 23 (B) are cross section diagrams showing another example of the mechanical structure of a two-phase motor.
Figure 23B:
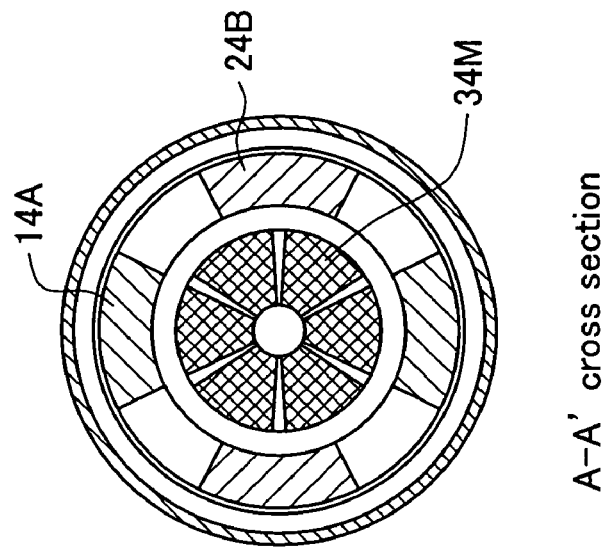

FIGS. 23 (A) and 23 (B) are cross section diagrams showing another example of the mechanical structure of the two-phase motor. This two-phase motor omitted the second coil group structure 50AB from the structure of FIG. 21 (A) and 21 (B), and has an inner rotor structure for which the roughly cylindrical rotor 30M (magnet group structure) is inserted inside the roughly cylindrical shaped stator 40AB (first coil group structure). The coil and magnet arrangement correlates to the one sided arrangement shown in FIGS. 15 (A) and 15 (B). When the one sided arrangement is realized using the inner rotor structure, it is possible to omit the yoke material 36 shown in FIGS. 15 (A) and 15 (B).

Figure 24A:
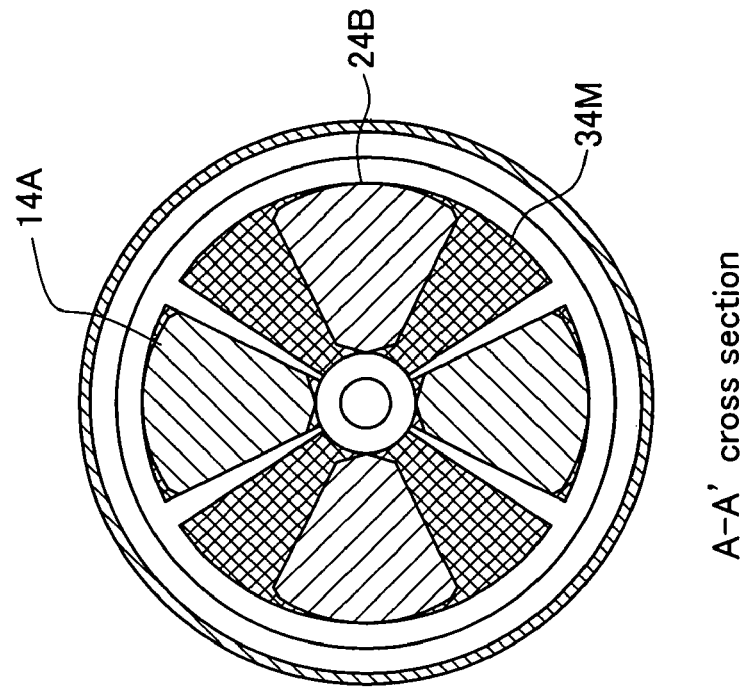
FIGS. 24 (A) and 24 (B) are cross section diagrams showing yet another example of the mechanical structure of a two-phase motor.
Figure 24B:
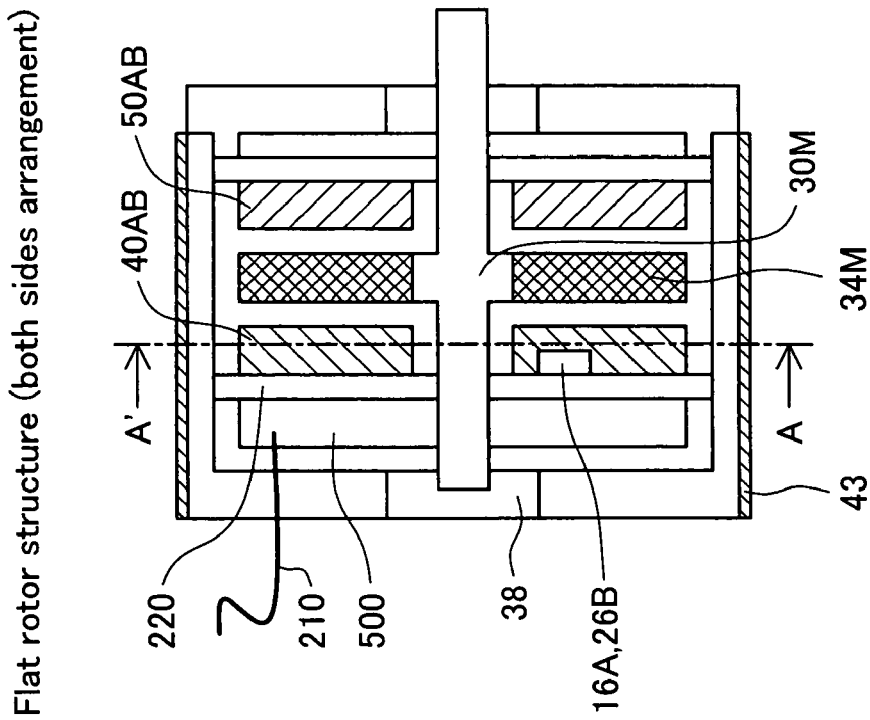

FIGS. 24 (A) and 24 (B) are cross section diagrams showing yet another example of the mechanical structure of the two-phase motor. This two-phase motor has a flat rotor structure for which a disk shaped rotor 30M (magnet group structure) is inserted between the disk shaped double layer stators 40AB and 50AB (coil group structures). When this kind of flat rotor structure is used, it is possible to make the motor thickness thinner.

Figure 25A:
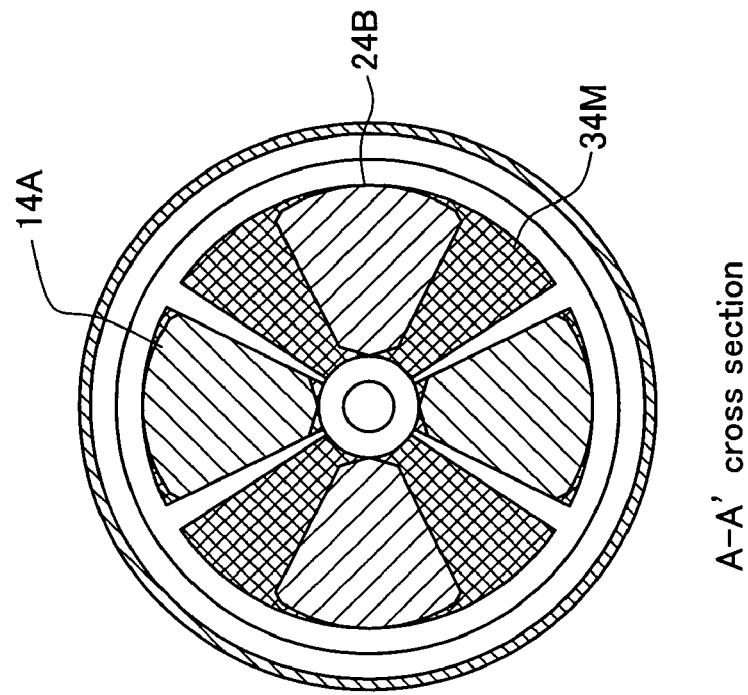
FIGS. 25 (A) and 25 (B) are cross section diagrams showing yet another example of the mechanical structure of a two-phase motor.
Figure 25B:
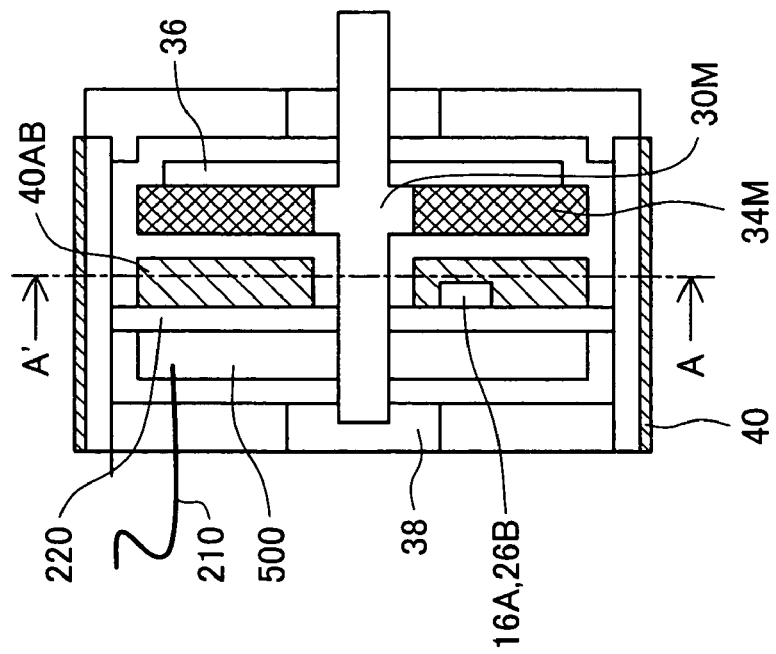

FIGS. 25 (A) and 25 (B) are cross section diagrams showing yet another example of the mechanical structure of a two-phase motor. This two-phase motor omits the second coil group structure 50AB from the structure of FIGS. 24 (A) and 24 (B), and has a flat rotor structure for which the disk shaped rotor 30M (magnet group structure) faces opposite the disk shaped stator 40AB (first coil group structure). A yoke material 36 is arranged at the back surface side of the rotor 30M (right side surface in the drawing). The coil and magnet arrangement correlates to the one sided arrangement shown in FIGS. 15 (A) and 15 (B).

As described above, various mechanical structures can be used for the electric machine of the present invention.

F. Second Embodiment (Three-Phase Motor)

Figure 26A:
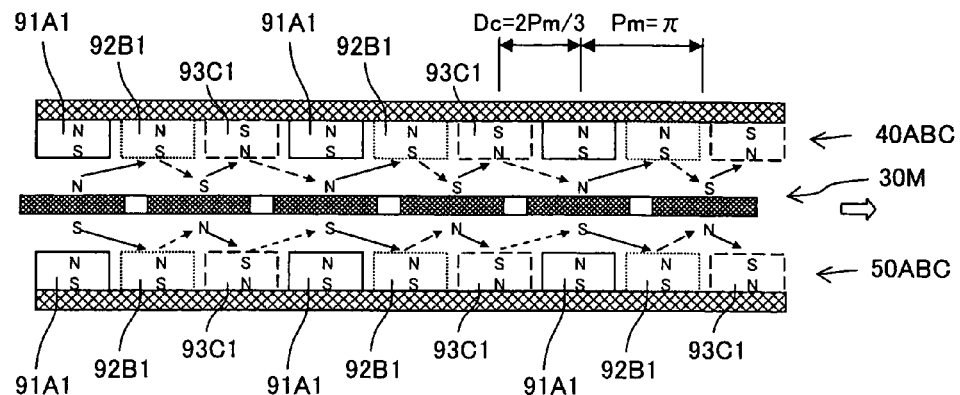
FIGS. 26 (A) to 26 (C) are explanatory drawings showing the schematic structure of a three-phase motor of the second embodiment of the present invention.
Figure 26B:
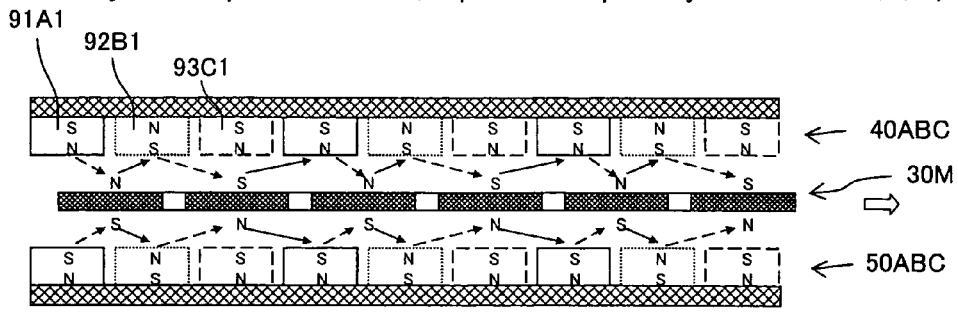
Figure 26C:
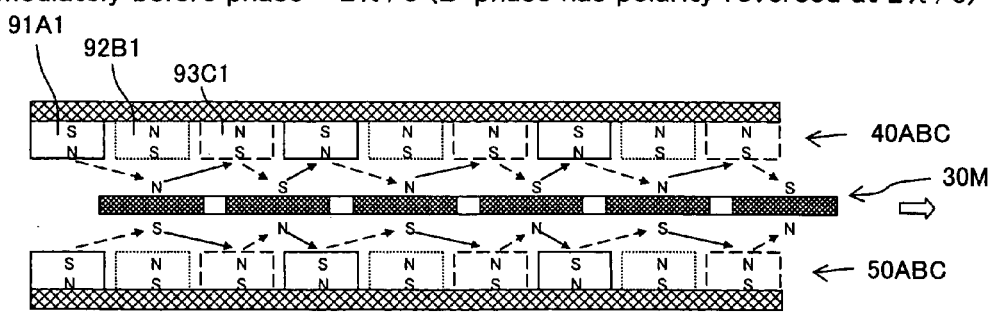

FIGS. 26 (A) to 26 (C) are explanatory drawings showing the schematic structure of the electric motor of the second embodiment of the present invention. The motor of this third embodiment is a three-phase motor comprising three sub coil groups for A-phase, B-phase, and C-phase. The magnet group structure 30M has the same structure as that of the first embodiment shown in FIG. 4 (A). A first coil group 40ABC and a second coil group 50ABC are provided at opposite sides across the magnet group structure 30M. The first coil group structure 40ABC has repeated arrangement of coil 91A1 of the A-phase sub coil group, coil 92B1 of the B-phase sub coil group, and coil 93C1 of the C-phase sub coil group. Note that in FIGS. 26 (A) to 26 (C), for convenience of illustration, the coils of the A-phase sub coil group are drawn with a solid line, the coils of the B-phase sub coil group are drawn with a dotted line, and the coils of the C-phase sub coil group are drawn with a dashed line. The second coil group structure 50ABC has the same structure as the first coil group structure 40ABC. Also, coils for the same phase in the first and second coil group structures 40ABC and 50ABC are arranged at mutually opposing positions. The sub coil group interval Dc for each of the A-phase, B-phase, and C-phase is ⅔ times the magnetic pole pitch Pm, correlating to $2\pi/3$ of the electrical angle. Specifically, for the sub coil group interval Dc and the magnetic pole pitch Pm relationship formula Dc=Pm(K/M), the second embodiment correlates to when K=2 and M=3.

Note that the A-phase sub coil group is constituted by only one type of coils 91A1. The same is also true for the B- and C-phase sub coil groups. This point is different from the point that for the first embodiment (FIG. 4 (A)), the A-phase sub coil group is constituted by two types of coils 14A1 and 14A2 which are excited in mutually reverse directions. The reason for this is that with the second embodiment, the value Dc×M, which is the phase count M(=3) multiplied by the sub coil group interval Dc(=2Pm/3=$2\pi/3$), becomes $2\pi$ of the electrical angle. The value of Dc×M correlates to the distance between adjacent coils of the same phase. Therefore, when this distance Dc×M is equal to $2\pi$, the adjacent coils of the same phase are always excited to the same polarity. In general, when the value of the integer K is an even number, all the coils within the sub coil group of each phase are always excited to the same polarity. Meanwhile, when the value of the integer K is an odd number, adjacent coils within the sub coil group of each phase are always excited to the reverse polarity.

FIG. 26 (A) shows the status immediately before the phase is 2π. At the timing when the phase is 2π, the polarity of the A-phase sub coil group 91A1 is reversed. FIG. 26 (B) shows the status immediately before the phase is π/3. At the timing when the phase is π/3, the polarity of the C-phase sub coil group 93C1 is reversed. FIG. 26 (C) shows the status immediately before the phase is 2π/3. At the timing when the phase is 2π/3, the polarity of the B-phase sub coil group 92B1 is reversed.

For the three-phase motor of this second embodiment as well, the polarity (magnetization direction) of the A-phase sub coil group 91A1 is switched at the timing when each coil of the A-phase sub coil group 91A1 opposes each magnet of the magnet group 30M. The same is also true for the B-phase sub coil group and the C-phase sub coil group. As a result, it is possible to always have generation of drive force from all the coils, so it is possible to generate a large torque.

Note that the three-phase motor of the second embodiment, the same as the first embodiment, does not have a magnetic substance core, and also does not have a yoke constituting the magnetic circuit. Also, it is preferable that all the structural members other than the rotation axis and the bearing be formed using non-magnetic, non-conductive materials.

FIG. 27 is a block diagram showing the constitution of the drive control unit of the second embodiment. This drive control unit 100c adds circuit parts for the C-phase (e.g. voltage comparators 115 and 116) and a sine wave generating circuit 108 to the circuitry for the two-phase motor shown in FIG. 8.

The sine wave generating circuit 108 generates three sine wave signals SA, SB, and SC shifted in sequence by a phase of 2π/3 each according to the three-phase sensor signals SSA, SSB, and SSC. The three sine wave signals SA, SB, and SC are input to the voltage comparators 111 to 116 and also supplied to the two-stage PWM circuit 130a. Note that the multiplexer 120a and the two-stage PWM circuit 130a are modified from those shown in FIG. 8 for three-phase use. The three-phase drive signal pairs (DRVA1, DRVA2), (DRVB1, DRVB2), and (DRVC1, DRVC2) are output from the two-stage PWM circuit 130a. Note that the waveform of each drive signal is about the same as that shown in FIG. 10 and FIG. 11, and the only difference is that the phase difference of each phase is 2π/3.

Figure 28:
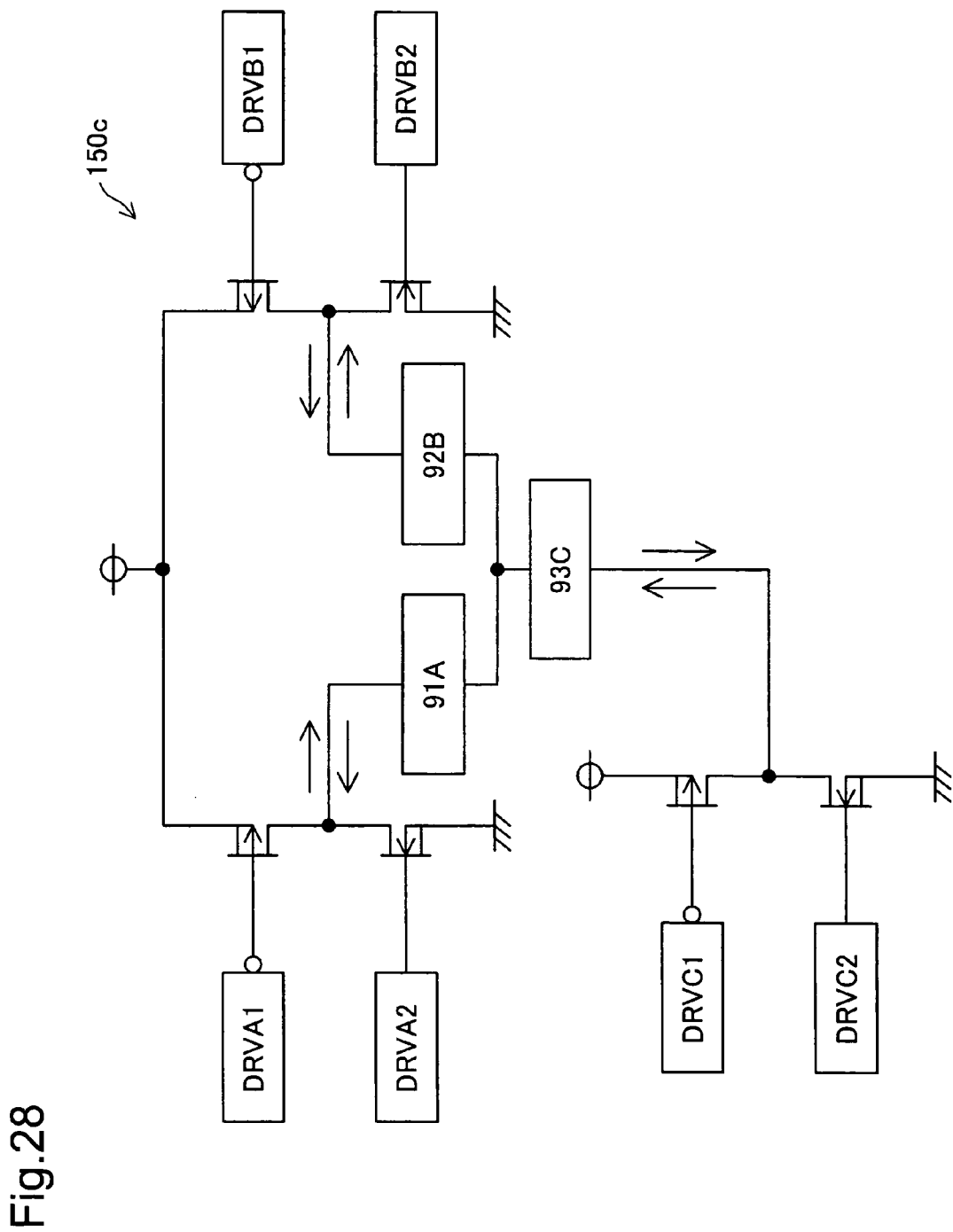
FIG. 28 is a block diagram showing the constitution of the driver circuit of the second embodiment.

FIG. 28 is a block diagram showing the constitution of the driver circuit for the second embodiment. This driver circuit 150c is a three-phase bridge circuit for driving the sub coil groups 91A, 92B, and 93C.

Figure 29:
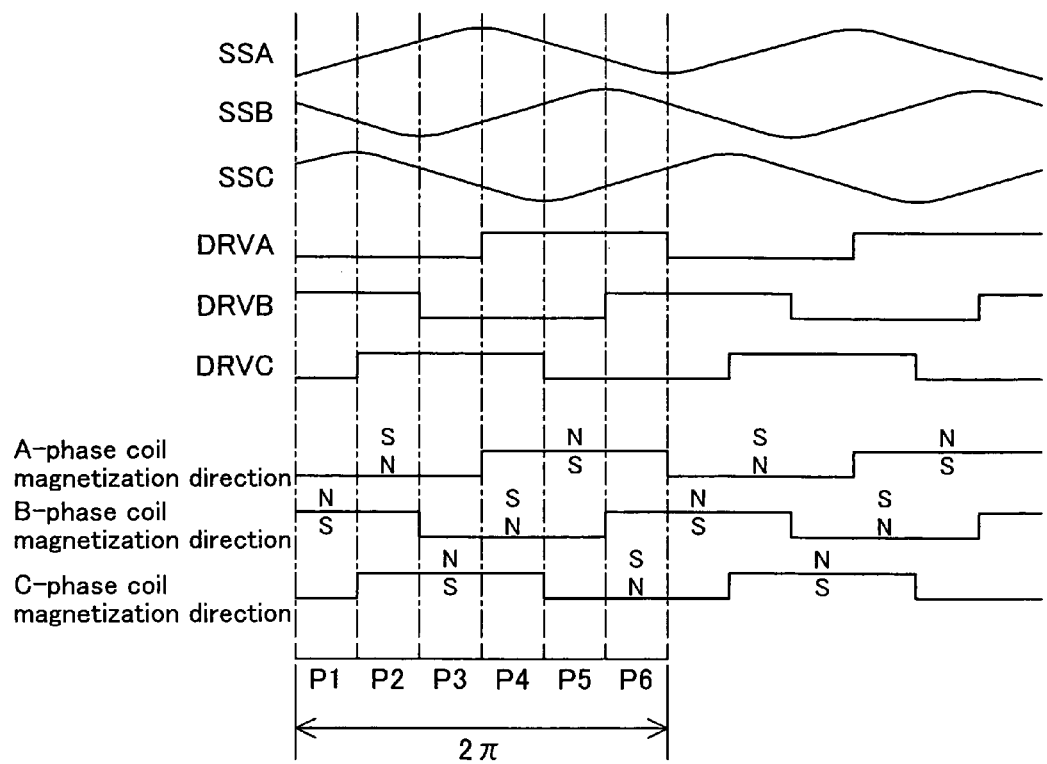
FIG. 29 is a timing chart showing the sensor signals and each phase coil magnetization direction of the second embodiment.
Figure 30A:
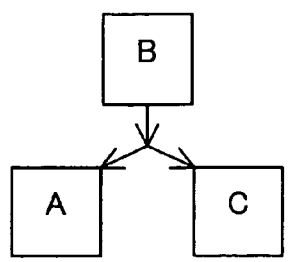
FIGS. 30 (A) to 30 (F) are explanatory drawings showing the current direction for the six periods P1 to P6 of the second embodiment.
Figure 30B:
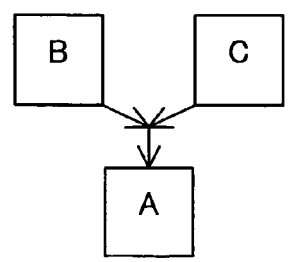
Figure 30C:
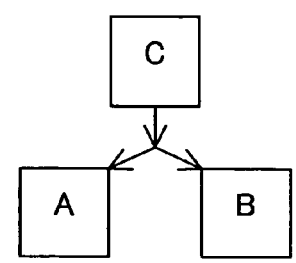
Figure 30D:
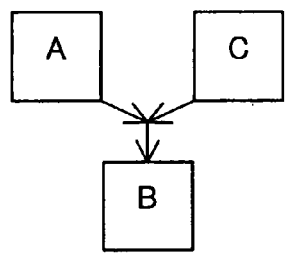
Figure 30E:
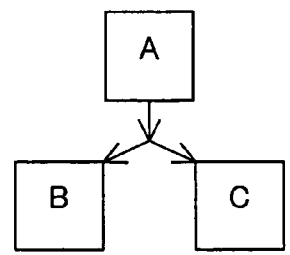
Figure 30F:
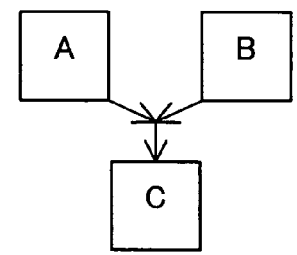
Figure 31A:
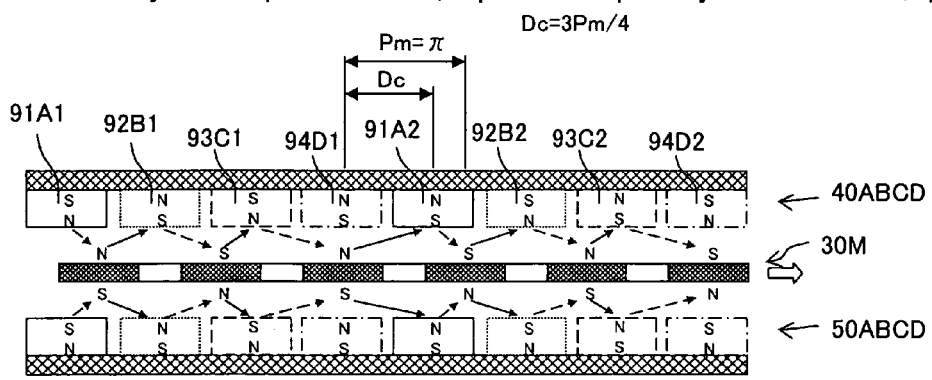
FIGS. 31 (A) to 31 (D) are explanatory drawings showing the schematic structure of a four-phase motor of the third embodiment of the present invention.
Figure 31B:
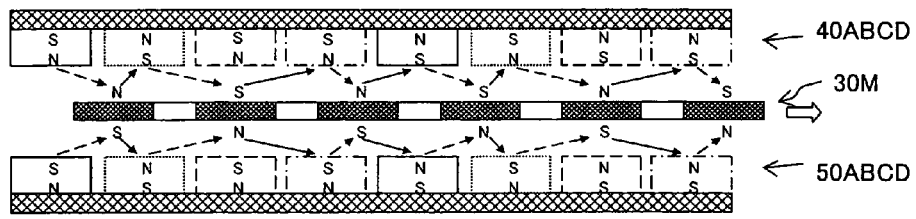
Figure 31C:
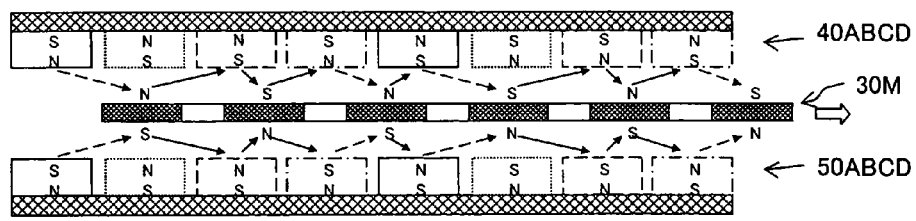
Figure 31D:
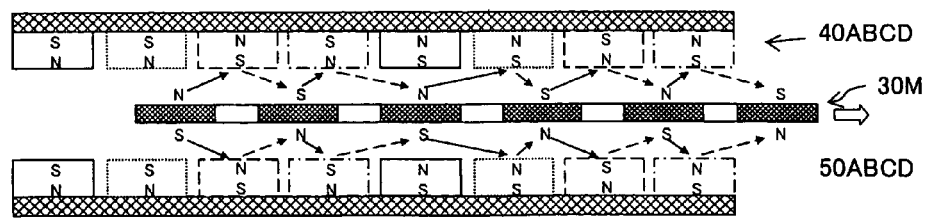

FIG. 29 is a timing chart showing the second embodiment sensor signals and each phase coil magnetization direction. The A, B, and C-phase sensor signals SSA, SSB, and SSC are digital signals for which the H level and the L levels are switched with each time period corresponding to an electrical angle of π. Also, the phases are shifted in sequence by 2π/3 each. At the bottom of FIG. 29 is shown the magnetization direction of each sub coil group of the A, B, and C phases. The magnetization direction of each sub coil group is determined by the logic calculation of the three sensor signals SSA, SSB, and SSC.

FIGS. 30 (A) to 30 (F) show the current direction for the six periods P1 to P6 of FIG. 29. With this embodiment, the A, B, and C phase sub coil groups are star connected but it is also possible to use a delta connection. In the period P1, the current flows from the B-phase sub coil group to the A-phase and C-phase sub coil groups. In the period P2, current flows from the B-phase and C-phase sub coil groups to the A-phase sub coil groups. In this way, it is possible to generate a large torque by driving each sub coil group so that current always flows in each A, B, and C phase sub coil group.

With the three-phase motor of the second embodiment as well, the two coil group structures 40ABC and 50ABC are provided at opposite sides across the magnet group structure 30M, and drive force is generated using the magnetic flux of both sides of the magnet group structure 30M, so it is possible to obtain a large drive force. Also, the three-phase motor of the second embodiment is constituted with no magnetic material core or yoke, so it is possible to be have a large torque with a light weight. Also, it is possible to maintain stable rotation up to a very low rotation count without cogging. It is also possible to use a one sided structure for which one of the two coil group structures 40ABC and 50ABC is omitted. In this case, it is possible to provide a yoke material 36 (FIGS. 15 (A), 15 (B)) on the magnet group structure 30M.

Note that as the mechanical structure of the three-phase motor, it is possible to use various structures such as the insert rotor structure, the inner rotor structure, the flat rotor structure, or the linear motor structure described above or the like. Also, the same kinds of variations as the various examples of the first embodiment described above can be used for the three-phase motor of the second embodiment as well.

G. Third Embodiment (Four-Phase Motor)

FIGS. 31 (A) to 31 (D) are explanatory drawings showing the schematic structure and the operation of the electric motor of the third embodiment of the present invention. The motor of this third embodiment is a four-phase motor comprising four sub coil groups for the A-phase, B-phase, C-phase, and D-phase. The magnet group structure 30M has the same structure as that of the first embodiment shown in FIG. 4 (A). A first coil group 40ABCD and a second coil group 50ABCD are provided at opposite sides across the magnet group structure 30M. The first coil group structure 40ABCD has coils 91A1 and 91A2 of the A-phase sub coil group, coils 92B1 and 92B2 of the B-phase sub coil group, coils 93C1 and 93C2 of the C-phase sub coil group, and coils 94D1 and 94D2 of the D-phase sub coil group, which are arranged in a specified sequence. Note that with FIGS. 31 (A) to 31 (D), for convenience of illustration, the A-phase sub coil group coils are drawn with a solid line, the B-phase sub coil group coils are drawn with a dotted line, the C-phase sub coil group coils are drawn with a dashed line, and the D-phase sub coil group coils are drawn with a dot-dash line. The second coil group structure 50ABCD also has the same constitution as that of the first coil group structure 40ABCD. Also, coils of the same phase of the first and second coil group structures 40ABCD and 50ABCD are arranged at opposing positions. The sub coil group interval Dc of each phase of the A-phase, B-phase, C-phase, and D-phase is 3/4 times the magnetic pole pitch Pm, correlating to 3π/4 of the electrical angle. Specifically, for the sub coil group interval Dc and magnetic pole pitch Pm relationship formula Dc=Pm (K/M), the third embodiment correlates to when K=3 and M=4.

Note that the A-phase sub coil group is constituted by two types of coils 91A1 and 91A2 magnetized in mutually reverse directions. The same is true for the other phases as well. This is resulted from the fact that the integer K is an odd number in the relationship formula Dc=Pm(K/M)

between the sub coil group interval Dc and the magnetic pole pitch Pm, as described with the second embodiment.

FIG. 31 (A) shows the status immediately before the phase is 2π. At the timing when the phase is 2π, the polarity of the D-phase sub coil group 94D is reversed. FIG. 31 (B) shows the status immediately before the phase is π/4. At the timing when the phase is π/4, the polarity of the C-phase sub coil group 93C is reversed. FIG. 31 (C) shows the status immediately before the phase is π/2. At the timing when the phase is π/2, the polarity of the B-phase sub coil group 92B is reversed. The FIG. 31 (D) shows the status immediately before the phase is 3π/4. At the timing when the phase is 3π/4, the polarity of the A-phase sub coil group 91A is reversed.

For this four-phase motor of the third embodiment as well, the polarity (magnetization direction) of the A-phase sub coil group 91A is switched at the timing when each coil of the A-phase sub coil group 91A opposes each magnet of the magnet group 30M. The sub coil groups of the other phases are also the same. As a result, it is possible to always have drive force generated from all the coils, thereby generating a large torque.

Note that the four-phase motor of the third embodiment also, like the first embodiment, does not have a magnetic substance core, and does not have a yoke constituting the magnetic circuit. Also, it is preferable that all the structural members other than the rotation axis and the bearing part be formed from a non-magnetic, non-conductive material.

Figure 32:
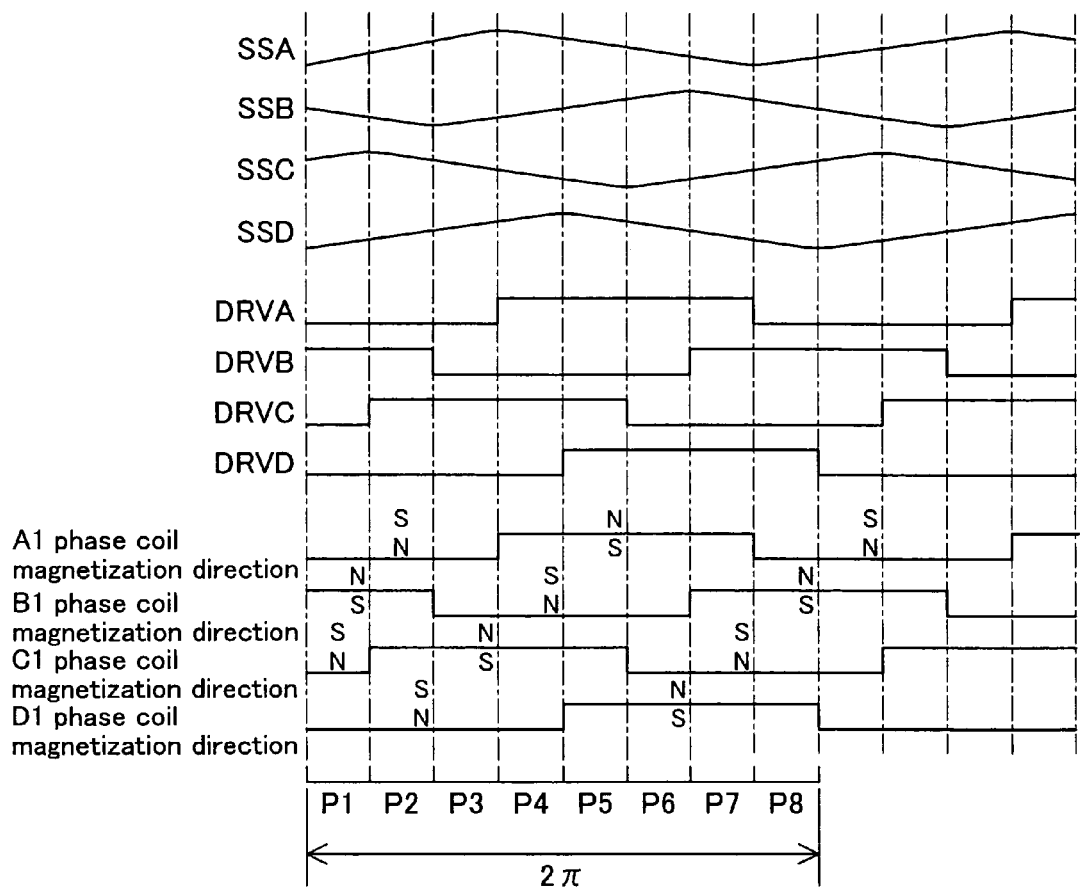
FIG. 32 is a timing chart showing the sensor signals and each phase coil magnetization direction of the third embodiment.

FIG. 32 is a timing chart showing the sensor signals and the magnetization direction of the coils of each phase for the third embodiment. Note that the constitution of the drive circuit unit of the third embodiment is analogous to the first embodiment (FIG. 7 and FIG. 8) and the second embodiment (FIG. 27) described above and can be constituted easily, so the description is omitted. In FIG. 32, the phases are shifted in sequence by 3π/4 each. At the bottom of FIG. 32, the magnetization direction of the sub coil group of each phase is shown. The magnetization direction of each sub coil group is determined by the logic calculation of the four sensor signals SSA, SSB, SSC, and SSD.

For the four-phase motor of the third embodiment as well, the two coil group structures 40ABCD and 50ABCD are provided at opposite sides across the magnet group structure 30M, and drive force is generated using the magnetic flux of both sides of the magnet group structure 30M, so it is possible to obtain a large drive force. Also, the four-phase motor of the third embodiment is also constituted with no magnetic substance core and no yokes, so it is possible to obtain a large torque with a light weight. It is also possible to maintain stable rotation up to a very low rotation count with no cogging. However, it is also possible to use a one sided structure with one of the two coil group structures 40ABCD and 50ABCD omitted. In this case, it is also possible to provide a yoke material 36 (FIGS. 15 (a) and 15 (B)) on the magnet group structure 30M.

Note that as the mechanical structure of the four-phase motor, it is possible to use various structures such as the insert rotor structure, the inner rotor structure, the flat rotor structure, or the linear motor structure described above or the like. Also, the same kinds of variations as the various examples of the first embodiment described above can be used for the four-phase motor of the third embodiment as well.

As can be understood from the various embodiments above, the present invention can be constituted as an M-phase motor having M sets of sub coil groups. Each sub coil group is constituted by one or more coils respectively. It is also possible to constitute the magnet group with one or more magnets. However, when the magnet group is constituted with only one magnet, each sub coil group is constituted by a plurality of coils. Meanwhile, when each sub coil group is constituted by only one coil, the magnet group is constituted by a plurality of magnets.

It is also possible to construct the drive signal generating circuit and the regenerative circuit so that they can operate the electric motor in an operating mode in which a drive force is generated from at least one sub coil group among the M sets of sub coil groups while electric power is regenerated from at least one other sub coil group.

H. Other Variation Examples (1) FIG. 33 (A) is an explanatory drawing showing a variation example of the coil shape and the magnet shape, and shows a vertical cross section of the right half of the motor. The rotor 30M rotates around the rotation axis 37. The magnet 34M is provided at the periphery of the rotor 30M, and A-phase coils 14A1 are arranged over and under the magnet 34M, respectively. Note that with this drawing, illustration of the other phase coils is omitted. The magnet 34M has a concave part at the center of the periphery, and is magnetized in the vertical direction. The coil 14A1 is a typical flat, ring shaped coil.

Figure 33A:
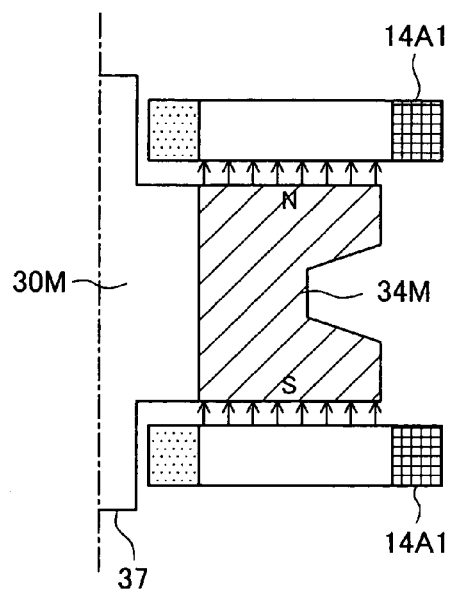
FIGS. 33 (A) and 33 (B) are explanatory drawings showing variation examples of the coil shape and the magnet shape.
Figure 33B:
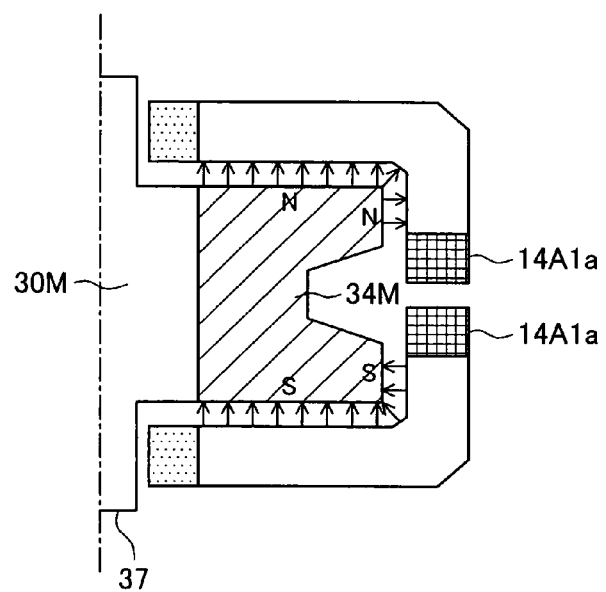

FIG. 33 (B) shows a structure using a ring shaped coil 14A1a bent into an L shape along the outline of the magnet 34M instead of the flat ring shaped coil 14A1. If this kind of bent ring shaped coil 14A1a is used, it is possible to effectively use the magnetic flux near the protruding part at the top and bottom of the magnet 34M. Therefore, it is possible to increase the electric motor efficiency.

(2) With the aforementioned embodiments and variation examples, for the most part, a rotation type motor was described, but the present invention can be used for various types of electric machine other than a rotation type motor. Also, the present invention is not limited to an actuator, but can also be used for a generator.

(3) With the aforementioned embodiments and variation examples, for the most part, the stator was constituted using a plurality of coil groups and the rotor was constituted using a magnet group, but it is also possible to constitute these in the reverse way. Generally, the present invention can be used for an actuator or a generator in which the relative position of the plurality of coil groups and the magnet group are changeable.

(4) The circuit configurations used with the aforementioned embodiments and variation examples are examples, and it is possible to use various circuit configurations other than these.

INDUSTRIAL APPLICABILITY

This invention can be used for various electric machines and power generating machines such as a rotation type motor, linear motor, or the like.

The invention claimed is:

1. An electric machine comprising:
 a first coil group containing a plurality of coils arranged along a specified direction; and
 a magnet group facing the first coil group and capable of moving relative to the first coil group along the specified direction;
 wherein the first coil group is classified into M phase sub coil groups each constituted by n coils where M is an integer of 2 or more and n is an integer of 1 or more, and the coils of the sub coil groups are aligned in sequence one at a time with a specified sub coil group interval Dc from the first phase sub coil group to the M-th phase sub coil group along the specified direction, the sub coil group interval Dc is set to a value of K/M times a magnetic pole pitch Pm (K is a positive integer excluding an integral multiple of M) where the magnetic pole pitch Pm is defined, in relation to the magnet group, to be a distance corresponding to an electrical angle of n along the specified direction, the adjacent sub coil groups are driven at a phase difference of (K/M)π, and each coil has substantially no magnetic material core.

2. An electric machine according to claim 1, wherein when the magnet group is seen from the first coil group side, N poles and S poles are arranged alternately along the specified direction, and the pitch between the N pole and the S pole is equal to the magnetic pole pitch Pm.

3. An electric machine according to claim 1, wherein when the magnet group is seen from the first coil group side, only a specified same one of the N pole and the S pole is repeatedly arranged along the specified direction, the pitch between the same poles is equal to 2 times the magnetic pole pitch Pm.

4. An electric machine according to claim 1, further comprising:
a case for accommodating the first coil group and the magnet group,
wherein each coil is wound around a core formed from a substantially nonmagnetic and non-electroconductive material, and
the case is formed from a substantially nonmagnetic and non-electroconductive material.

5. An electric machine according to claim 1, wherein structural members with exception of shafts and bearings are formed from substantially nonmagnetic and non-electroconductive material.

6. An electric machine according to claim 1, wherein the integer K is an odd number, and
a coil count n of each sub coil group is 2 or greater, and the coils in the same sub coil group are interconnected in such a manner that adjacent coils belonging to the same sub coil group are always excited with mutually opposite polarities.

7. An electric machine according to claim 1, wherein the integer K is an even number, and
a coil count n of each sub coil group is 2 or greater, and the coils in the same sub coil group are interconnected in such a manner that adjacent coils belonging to the same sub coil group are always excited with a mutually identical polarity.

8. An electric machine according to claim 1, further comprising:
a second coil group provided on a opposite side from the first coil group across the magnet group, a relative position of the second coil group to the first coil group being fixed, wherein the second coil group has same coil arrangement as the first coil group, and the m-th phase sub coil group (m is an integer from 1 to M) of the first coil group and the m-th phase sub coil group of the second coil group are arranged at opposing positions across the magnet group, and are always magnetized to a mutually identical polarity.

9. An electric machine according to claim 1, further comprising:
a drive signal generating circuit for supplying M alternating current drive signals to the M phase sub coil groups,
wherein the drive signal generation circuit generates the M alternating current drive signals so that polarity of each coil in each sub coil group are switched when center of each coil is opposite to one of centers of the magnets in the magnet group, and that magnetic flux density in each sub coil group reaches a maximum value at a timing when midway points between two adjacent coils in the same phase sub coil group are opposite to the centers of the magnets in the magnet group.

10. An electric machine according to claim 9, wherein the drive signal generating circuit is capable of reversing an operating direction of the first coil group and the magnet group by reversing a current direction of each sub coil group.

11. An electric machine according to claim 9, wherein the drive signal generating circuit includes:
a PWM circuit for generating M PWM signals whose phases are mutually shifted by (K/M)π, and
a masking circuit for generating the M alternating current drive signals by masking the M PWM signals according to an output demand of the electric machine.

12. An electric machine according to claim 11, wherein the masking circuit masks each PWM signal in a temporal range that is symmetrically centered around a timing at which polarity of each alternating current drive signal is inverted.

13. An electric machine according to claim 9, further comprising:
a regenerative circuit for regenerating electric power from the coil groups,
wherein the drive signal generation circuit and the regenerative circuit are capable of operating the electric machine in an operation mode in which a drive force is generated from at least one of the M sub coil groups while electric power is regenerated from at least one other sub coil group.

* * * * *

UNITED STATES PATENT AND TRADEMARK OFFICE
CERTIFICATE OF CORRECTION

PATENT NO. : 7,126,309 B1 Page 1 of 1
APPLICATION NO. : 10/562580
DATED : October 24, 2006
INVENTOR(S) : Kesatoshi Takeuchi and Takahiro Sagawa It is certified that error appears in the above-identified patent and that said Letters Patent is hereby corrected as shown below:

Title Page, (54) Title: "MOTOR" should be --ELECTRIC MACHINE--

Title Page, (75) Inventors,
1st inventor's address: "Shioziri" should be --Shiojiri--.

Title Page, (56) References Cited,
Foreign Patent Documents, No. 4: "JP  9-275672 A" should be --JP 9-275673 A--.

Column 1, Line 1: "MOTOR" should be --ELECTRIC MACHINE--

Column 25, Line 10: "n" should be --π--.

Signed and Sealed this

Twenty-seventh Day of November, 2007

JON W. DUDAS
*Director of the United States Patent and Trademark Office*